United States Patent
Miyasaka et al.

(10) Patent No.: US 6,279,990 B1
(45) Date of Patent: Aug. 28, 2001

(54) MOTOR VEHICLE BODY WITH A VERTICALLY ORIENTED MEMBER

(75) Inventors: Hiroyuki Miyasaka, Yokohama; Hidetsugu Saeki; Maki Sano, both of Kanagawa, all of (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/531,524

(22) Filed: Mar. 21, 2000

(30) Foreign Application Priority Data

| Mar. 29, 1999 | (JP) | 11-086895 |
|---|---|---|
| Sep. 27, 1999 | (JP) | 11-272993 |
| Dec. 8, 1999 | (JP) | 11-349497 |

(51) Int. Cl.[7] .................................................. B60R 21/02
(52) U.S. Cl. ..................... 296/203.03; 296/189; 296/209
(58) Field of Search ........................... 296/146.5, 146.6, 296/188, 189, 203.03, 207, 209

(56) References Cited

U.S. PATENT DOCUMENTS

| 4,272,103 | * | 6/1981 | Schmid et al. ........................ 280/751 |
| 5,096,254 | * | 3/1992 | Sparke ................................... 296/193 |
| 5,246,264 | * | 9/1993 | Yoshii .................................... 296/203 |
| 5,382,071 |   | 1/1995 | Enning et al. ........................ 296/203 |
| 5,385,383 |   | 1/1995 | Kreis et al. ........................... 296/202 |
| 5,398,989 |   | 3/1995 | Winter et al. ......................... 296/203 |
| 5,671,968 | * | 9/1997 | Masuda et al. ....................... 296/188 |
| 5,820,204 | * | 10/1998 | Masuda et al. ....................... 296/188 |
| 5,984,402 | * | 11/1999 | Takeuchi .............................. 296/188 |
| 5,992,924 | * | 11/1999 | Noritake et al. ..................... 296/189 |
| 6,102,472 | * | 8/2000 | Wallstrom ....................... 296/203.01 |
| 6,129,410 | * | 10/2000 | Kosaraju et al. .................... 296/188 |

FOREIGN PATENT DOCUMENTS

| 0040123 A1 | 11/1981 | (EP) . |
| 0832705 A2 | 4/1998 | (EP) . |
| 2303589 | 2/1997 | (GB) . |
| 10-181635 | 7/1998 | (JP) . |

OTHER PUBLICATIONS

European Search Report Nov. 17, 2000.

* cited by examiner

*Primary Examiner*—Joseph D. Pape
*Assistant Examiner*—Paul Chenevert
(74) *Attorney, Agent, or Firm*—McDermott, Will & Emery

(57) ABSTRACT

A motor vehicle body structure has a vertically oriented front door latch pillar. The pillar is formed of a light metal alloy. The pillar has an upper end joined to a side roof rail and a lower end joined to a side sill. At a transition point between the upper and lower ends, the pillar defines a boundary between an upper structure portion and a lower structure portion. The upper structure portion extends between the upper end and the predetermined point. The lower structure portion extends between the predetermined point and the lower end. The upper and lower structure portions implement reinforcement and deformation permission measures, respectively.

32 Claims, 33 Drawing Sheets

MOTOR VEHICLE BODY WITH A VERTICALLY ORIENTED MEMBER

The contents of disclosure of Japanese Patent Applications Nos. 11-349497, filed Dec. 8, 1999, 11-272993, filed Sep. 27, 1999, and 11-86895, filed Mar. 29, 1999, are hereby incorporated by reference in their entirety.

FIELD OF THE INVENTION

The present invention relates to a motor vehicle body of light metal alloy, and more particularly to a front door latch pillar in a motor vehicle body.

BACKGROUND OF THE INVENTION

JP-A 10-181635 discloses a vehicle body side unit. In the conventional body side unit, a vertically oriented front door latch pillar is provided for joining a roof stringer to a lower lengthwise member of the vehicle, such as, a floor side sill member. This body side unit is formed of light metal alloy by casting. The vehicle body constructed by such body side unit is advantageous over a vehicle body constructed by a great number of elements formed by pressing in reduction of number of working processes and reduction of cost.

The above-mentioned vehicle body is satisfactory to certain extent. However, a need remains to improve distribution of strength and rigidity, and to accomplish further reduction in cost and weight.

Accordingly, an object of the present invention is to provide a motor vehicle body structure that has optimum distribution of strength and rigidity with reduced cost and weight.

SUMMARY OF THE INVENTION

According to the present invention, there is provided a motor vehicle body, comprising:
  a vertically oriented member having an upper end portion joined to a roof side rail and a lower end portion joined to a side sill,
  said vertically oriented member having a transition point between the upper and lower end portions,
  said vertically oriented member including a reinforcement measure and a deformation permission measure, said transition point being located between said reinforcement measure and said deformation permission measure.

DESCRIPTION OF THE PREFERRED EMBODIMENTS

Figure 1:
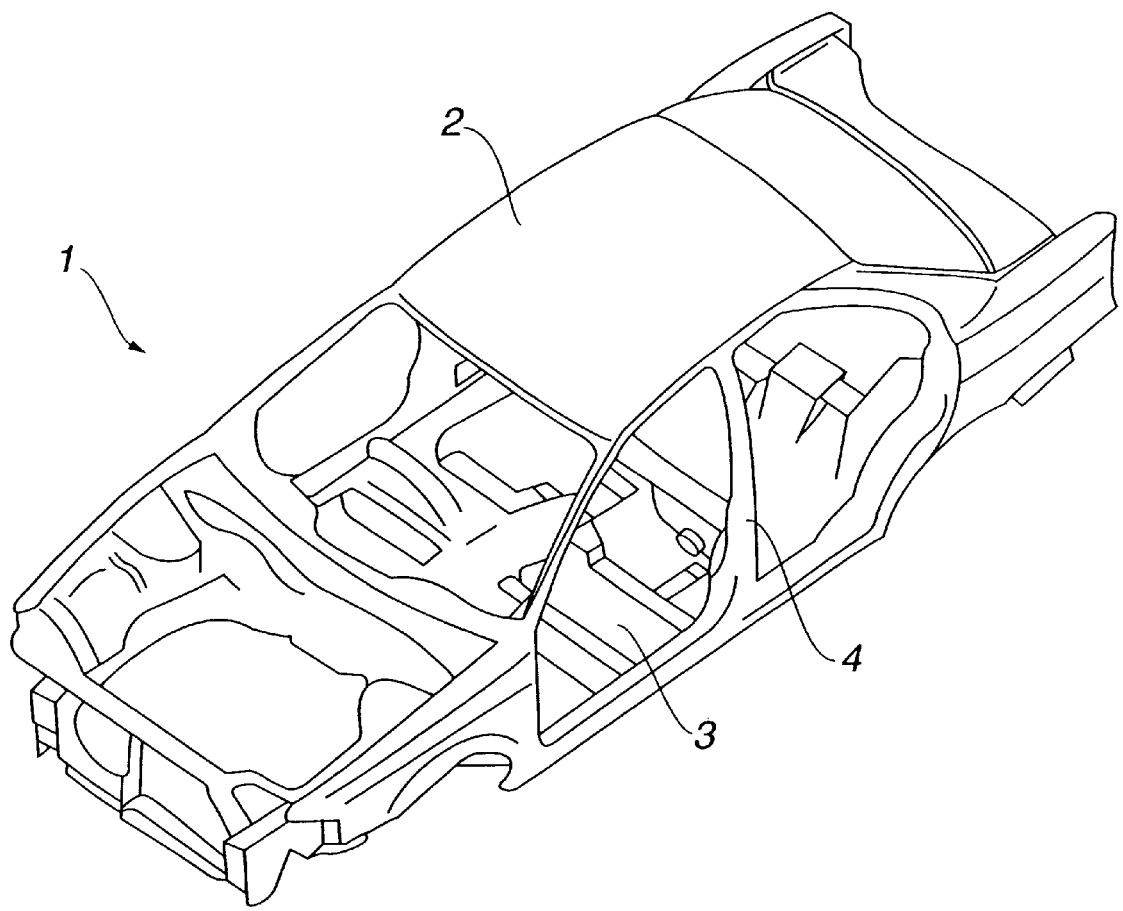
FIG. 1 is a perspective view of a motor vehicle body structure implementing the present invention.
Figure 57:
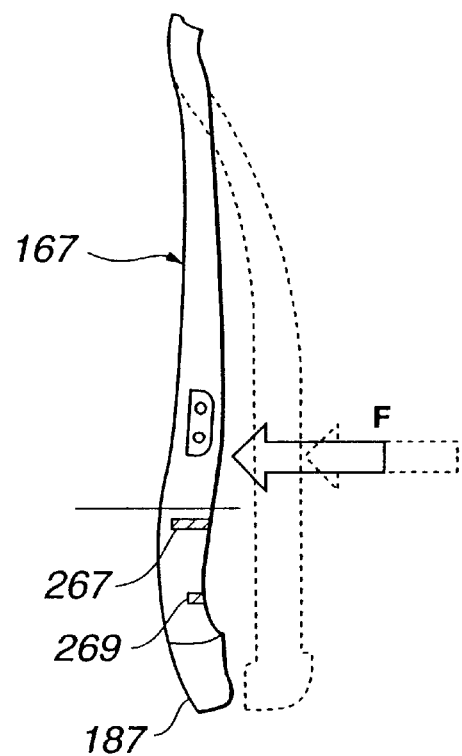
FIG. 57 is a similar view to FIG. 8.

Referring to FIGS. 1 through 57 of the accompanying drawings, like or similar reference numerals are used throughout all Figures to designate like or similar parts or portions.

(First Preferred Implementation)

Referring to FIGS. 1 to 8, a description is made as to the first preferred implementation according to the present invention. Specifically, FIGS. 1, 2, 3A, 3B, and 4–8 illustrate the first preferred implementation.

Figure 2:
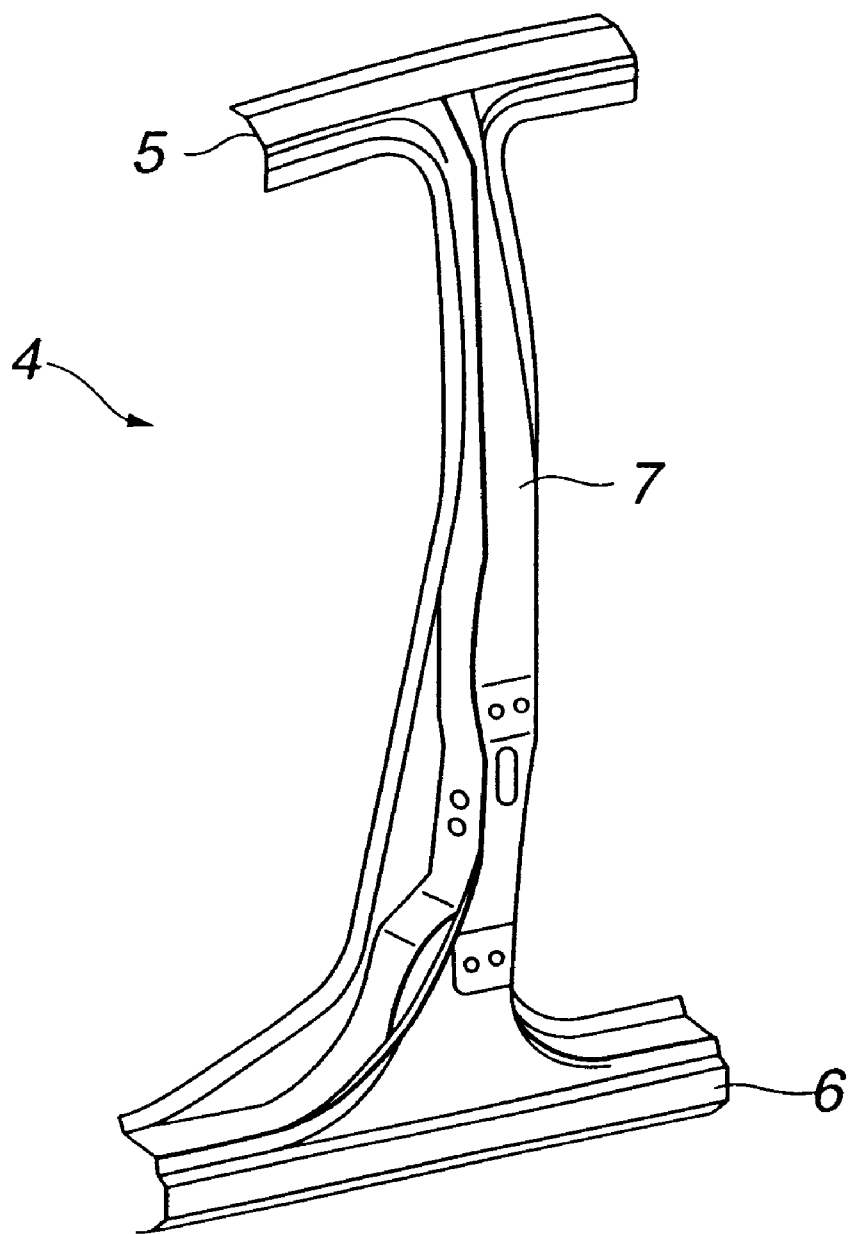
FIG. 2 is a fragmentary view of a side body unit of the vehicle body structure including a vertically oriented front door latch pillar, which illustrates a first preferred implementation of the present invention.

Referring to FIG. 1, a motor vehicle body structure 1 has a passenger compartment and includes a roof unit 2, a floor unit 3, and a pair of body side units 4, namely, a left hand body side unit and a right hand body side unit. The body side units 4 are spaced transversely with respect to a longitudinal centerline of the motor vehicle body structure 1 and join the roof unit 2 to the floor unit 3. Referring to FIG. 2, the left hand body side unit 4 includes a front door latch pillar 7, which joins a roof stringer or roof side rail 5 to a floor side sill 6. Although not shown, the right hand body side unit is a mirror image, in structure, of the left hand body side unit 4 and thus includes a front door latch pillar that is a mirror image, in structure, of its counterpart 7 of the left hand body side unit 4. At an upper end, each of the front door latch pillars 7 is integrally connected to the corresponding roof stringer 5 of the roof unit 2. At a lower end, each of the front door latch pillars 7 is integrally connected to the corresponding floor side sill 6. Each of the side body units 4 is formed of a light metal alloy, such as, for example, aluminum alloy casting.

The front door latch pillars of the vehicle body perform an important function in the bearing structure since they provide the necessary rigidity for the passenger compartment. As a consequence, they must be able to withstand heavy loads, especially during a side impact.

Figure 3A:
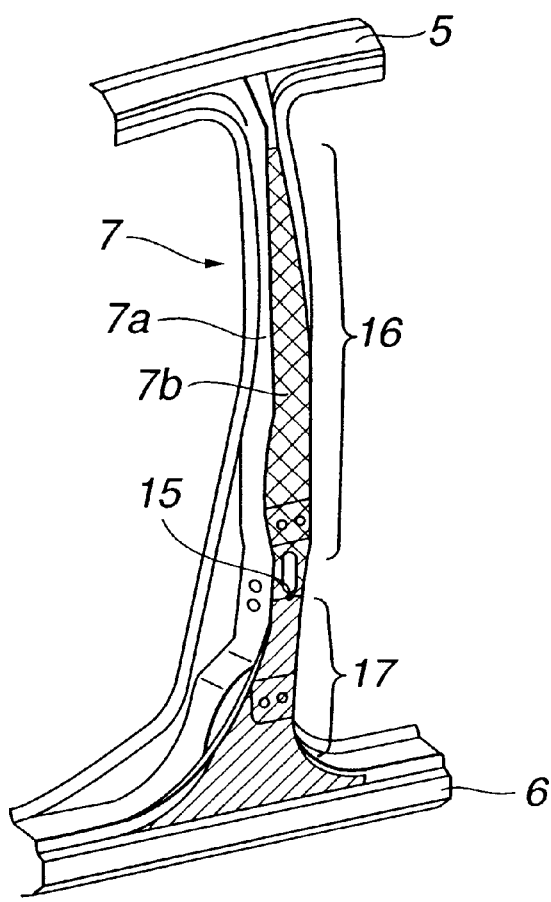
FIG. 3A is a similar view to FIG. 2 illustrating an upper and lower structure portions of the front door latch pillar.
Figure 3B:
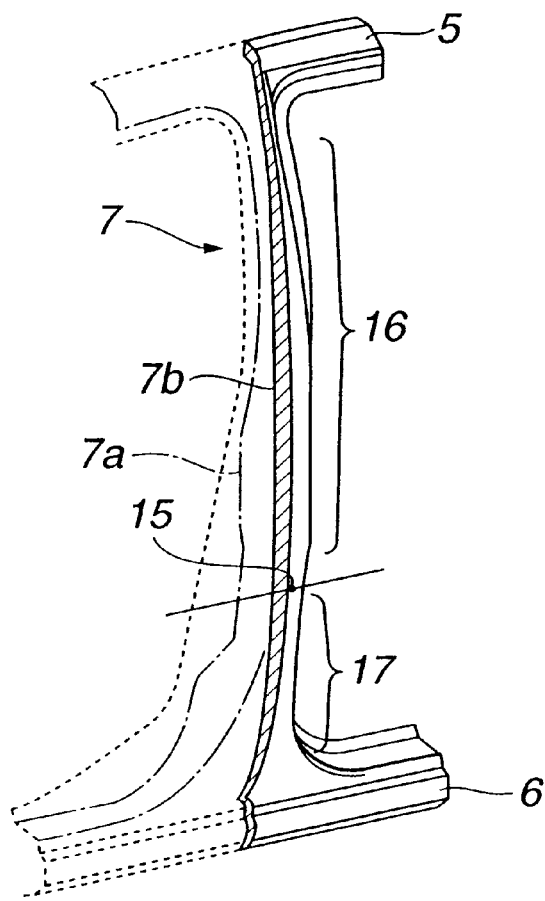
FIG. 3B is a similar view to FIG. 2 with unnecessary portions removed to show a vertical cross sectional profile.

Referring to FIGS. 3A and 3B, the vertically oriented front door latch pillar 7 has an upper end integrally connected to the side roof rail 5 and a lower end integrally connected to the side sill 6. At a transition point 15 between the upper and lower ends, the pillar 7 defines a boundary between an upper structure portion 16 and a lower structure portion 17. The upper structure portion 16 extends between the upper end and the transition point 15. The lower structure portion 17 extends between the transition point 15 and the lower end. The upper and lower structure portions 16 and 17 have different strength and rigidity characteristics during a side impact. The strength with which the upper structure portion 16 withstands heavy loads during a side impact is greater than the strength of the lower structure portion 17. According to the first preferred implementation, thickening the wall of the pillar 7 over the upper structure portion 16 and thinning the wall of the pillar 7 over the lower structure portion 17 accomplish a desired distribution of strength and rigidity. The thickness of the pillar wall determines the strength and rigidity. If desired, the cross sectional area may be used to determine the strength and rigidity. In this case, increasing the cross sectional area of the pillar 7 over the upper structure portion 16 and decreasing the cross sectional area of the pillar 7 over the lower structure portion 17 accomplish the desired distribution of strength and rigidity. Setting is such that, over the lower structure portion 17, the strength and rigidity grow gradually from the lower end toward the transition point 15, and the strength and rigidity over the upper structure portion 16 are greater than those over the lower structure portion 17.

Figure 4:
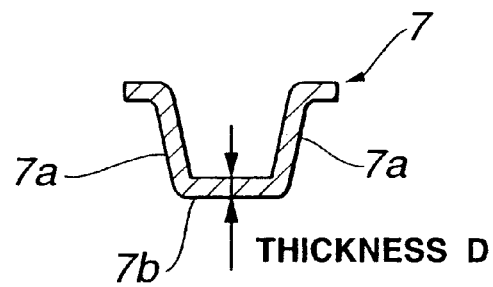
FIG. 4 illustrates a cross sectional profile of the pillar shown in FIG. 2.
Figure 5:
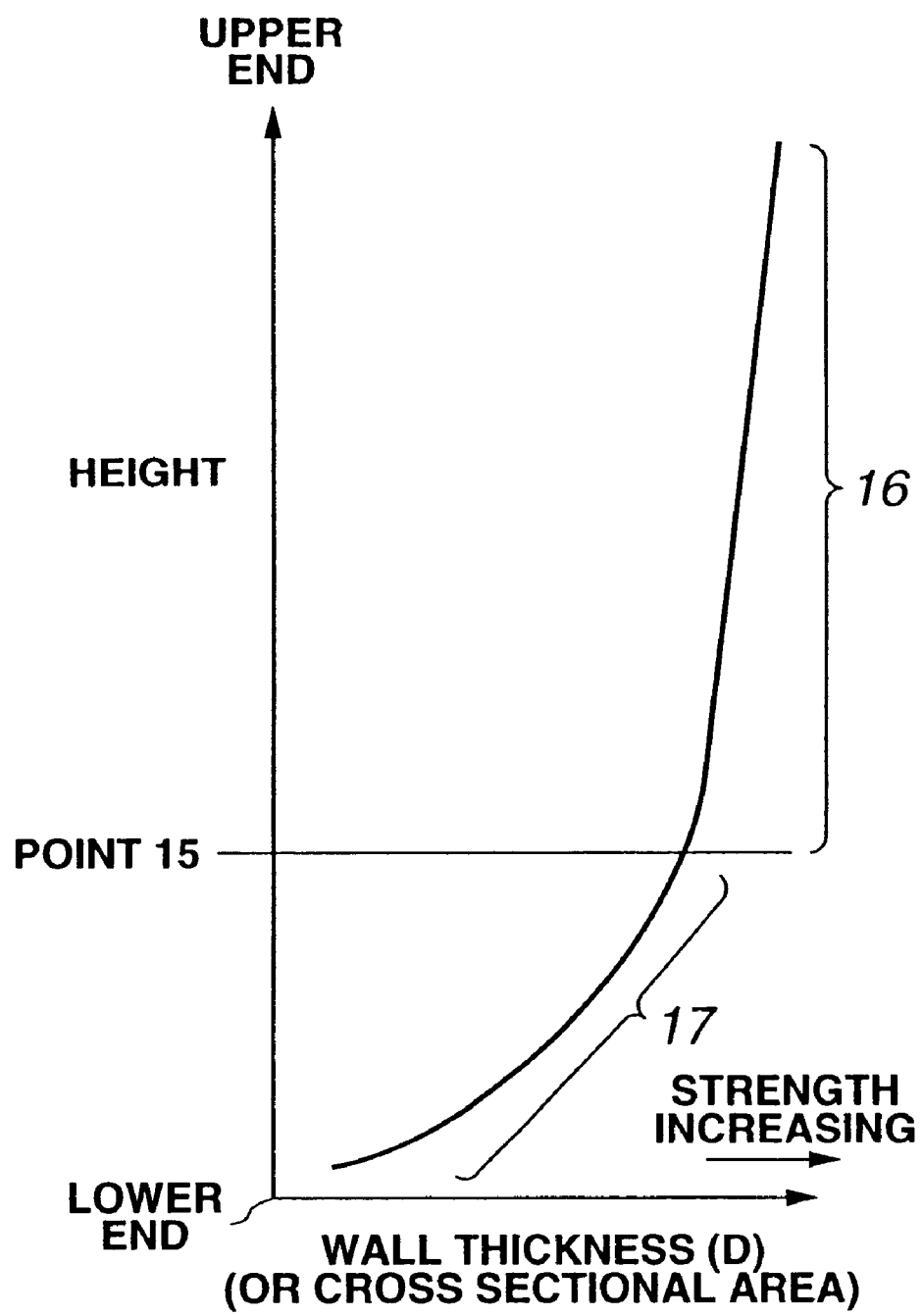
FIG. 5 is a graphical representation of distribution of effective cross sectional area of the pillar shown in FIG. 2 in the vertical direction.
Figure 6:
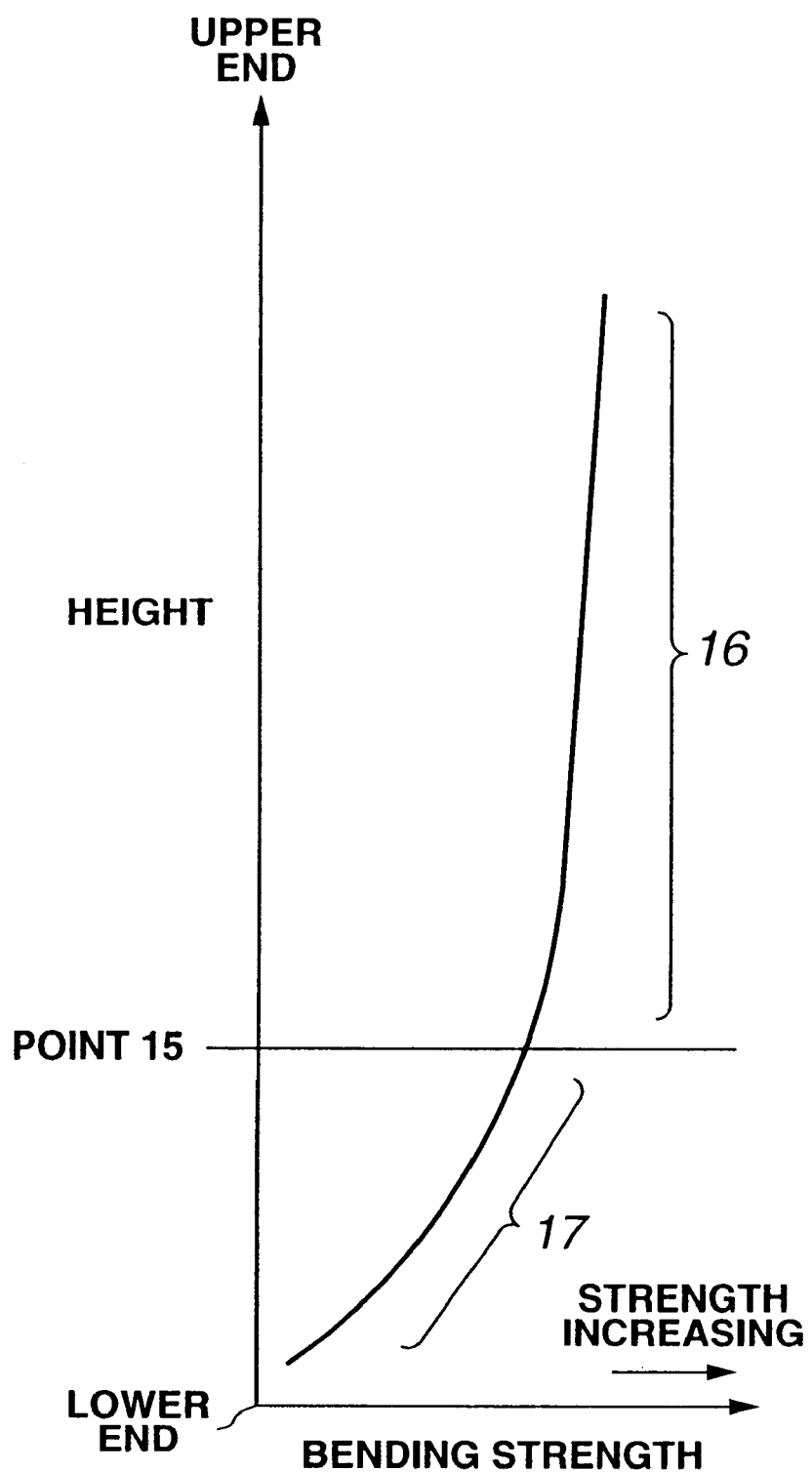
FIG. 6 is a graphical representation of distribution of strength of the pillar shown in FIG. 2 in the vertical direction.

Referring also to FIG. 4, the front door latch pillar 7 has a channel section including a pair of spaced end walls 7a and a peripheral wall 7b interconnecting the pair of spaced end walls 7a. The end walls 7a are spaced in a direction that extends generally along the longitudinal centerline of the vehicle body. The wall 7b faces laterally outwardly. In this example, the thickness D of wall 7b is common over the entirety of the pillar 7. As shown by the distribution of wall thickness in FIG. 5, the thickness of wall D decreases gradually from the upper end toward the lower end of the pillar 7. The transition point 15 is located below an intermediate point equidistant from the upper and lower ends of the pillar 7. There is a change in strength and rigidity of the pillar 7 at the transition point 15. In FIG. 5, the thickness of wall D decreases rapidly at the transition point 15 toward the lower structure portion 17 from the upper structure portion 16. FIG. 6 shows the distribution of strength and rigidity produced by the distribution of thickness of wall D in FIG. 5.

Figure 7:
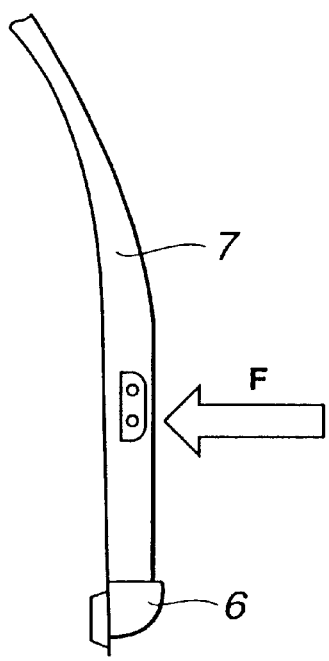
FIG. 7 is a view illustrating the pillar prior to deformation produced by a side impact force F.
Figure 8:
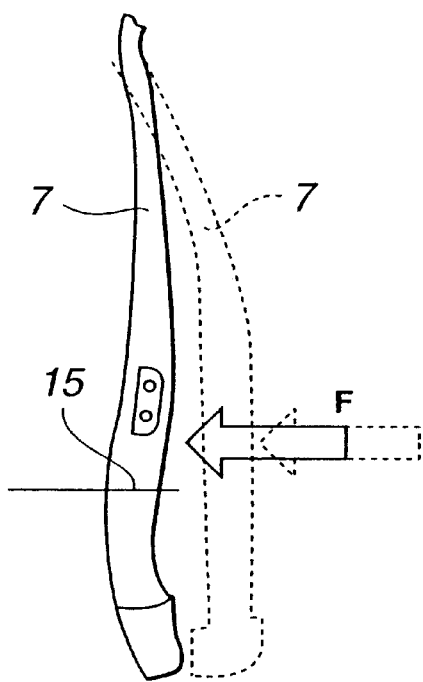
FIG. 8 is a view illustrating the pillar after the deformation produced by the side impact force.
Figure 9:
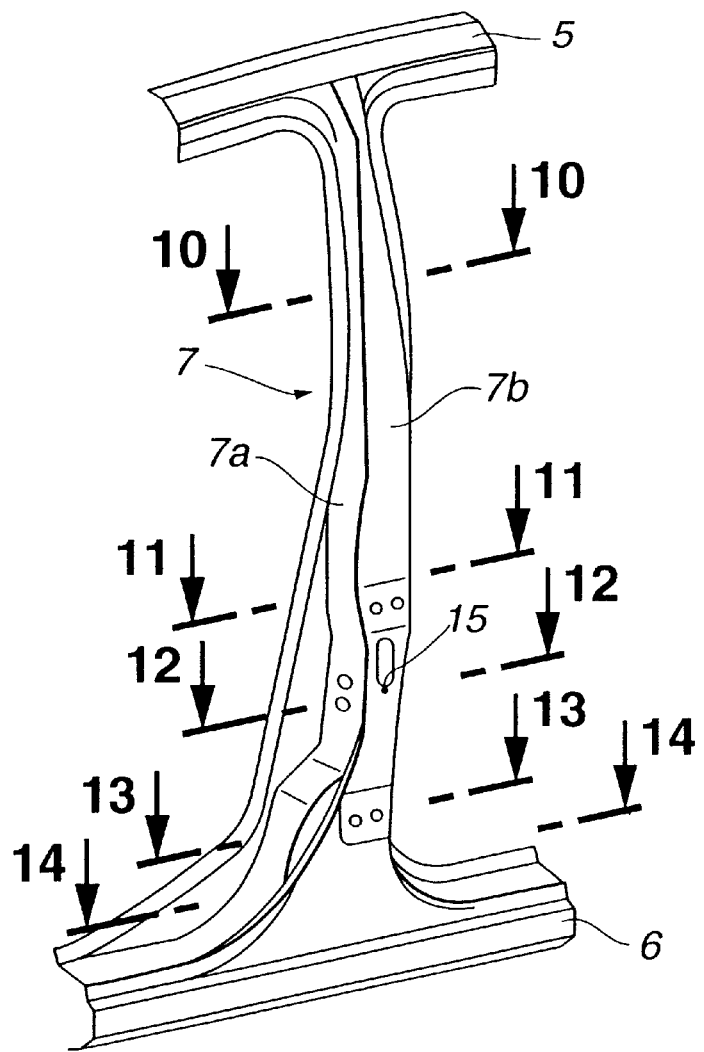
FIG. 9 is a fragmentary view of a body side unit including a front door latch pillar and the adjacent parts, illustrating a second preferred implementation of the present invention.
Figure 10:
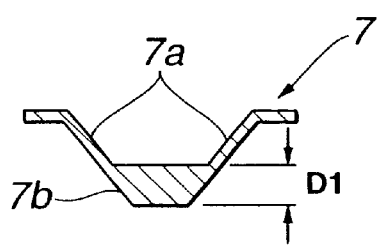
FIG. 10 is a cross section taken though the line 10—10 of FIG. 9.
Figure 11:
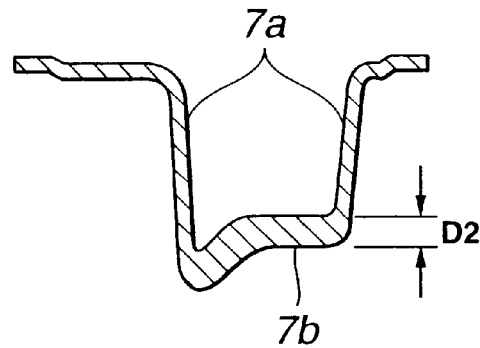
FIG. 11 is a cross section taken through the line 11—11 of FIG. 9.
Figure 12:
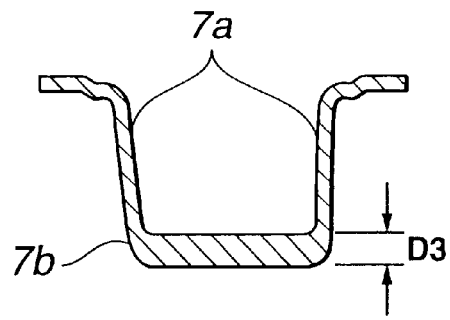
FIG. 12 is a cross section taken through the line 12—12 of FIG. 9.
Figure 13:
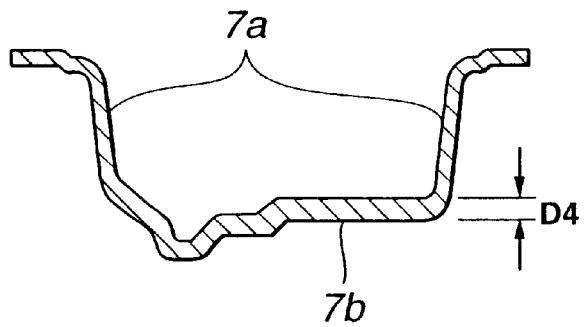
FIG. 13 is a cross section taken through the line 13—13 of FIG. 9.
Figure 14:
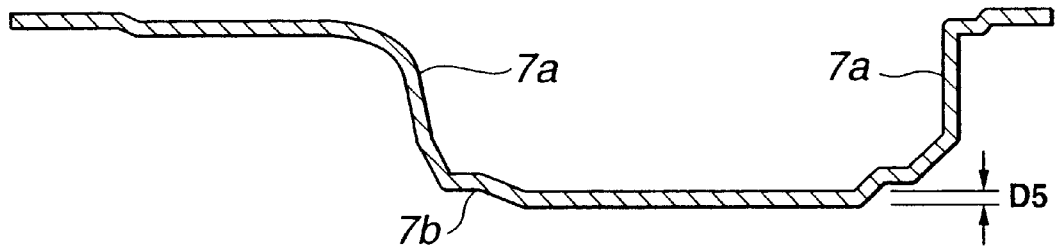
FIG. 14 is a cross section taken through the line 14—14 of FIG. 9.

Referring to FIGS. 7 and 8, an arrow F represents a force imparted to the pillar 7 during a side impact. FIG. 7 illustrates the state of the pillar 7 before deformation, and FIG. 8 illustrates the sate of the pillar 7 after deformation. As mentioned before, the lower structure portion 17 below the transition point 15 has less strength and rigidity than the upper structure portion 16 above the transition point 15. Accordingly, during side impact, the lower structure portion 17 is more deformable than the upper structure portion 16 is. As shown in FIG. 8, at the lower structure portion 17, the pillar 7 is deformed inwardly into a lower portion of the passenger compartment, but the upper structure portion 16 is less deformed into the passenger compartment. The upper structure portion 16 is less deformed inwardly into the passenger compartment during side impact, thus minimizing interference with a seat occupant near the pillar 7. The lower structure portion 17 is deformed to absorb energy during side impact, thus minimizing impact upon the seat occupant (s) within the passenger compartment. In this manner, the necessary strength and rigidity for the passenger compartment is provided by the appropriate distribution of strength over the pillar 7, which provides effective energy absorption characteristic during a side impact.

According to the first preferred implementation, the transition point 15 is located below the intermediate point equidistant from the upper and lower end of the pillar 7. The lower structure portion 17 situated further below the intermediate point is deformed when the pillar 17 withstands heavy loads during application of the force F (see FIGS. 7 and 8). In the process, the upper structure portion 16 including the intermediate point is left as it is or least deformed, thus avoiding or at least minimizing the interference with the seat occupant(s) within the passenger compartment.

According to the first preferred implementation, the distribution of the wall thickness D as shown in FIG. 5 is realized by thickening the upper structure portion 16 and thinning the lower structure portion 17 using the casting technique. With the casting technique, it is easy to vary the wall thickness as desired.

According to the first preferred implementation, the wall thickness D of the pillar 7 decreases gradually from the upper end toward the lower end, thus providing efficient distribution of continuous varying characteristic of strength in the longitudinal direction of the pillar 7. Hence, a reduction in weight of the pillar 7 is accomplished by trimming unnecessary wall portions.

According to the first preferred implementation, at the transition point 15, the strength of the pillar 7 is subject to a great reduction toward the lower end from the upper end. With this structure, when the pillar 7 withstands heavy loads during application of the force F, it is highly probable that the lower structure portion 17 below the transition point 15 only may be deformed, thus avoiding or at least minimizing the probability that the pillar 7 may interfere with seat occupant(s).

According to the first preferred implementation, the side sill 6 and the side roof rail 5 are integrally formed with the pillar 7 by the casting technique. Accordingly, it is no longer necessary to prepare a side sill and a side roof rail as separate parts from a front door side pillar, thus suppressing cost needed to form dies or metallic molds and reducing the number of steps needed for assembly.

According to the first preferred implementation, the desired distribution of strength of the pillar 7 is accomplished by varying the wall thickness D. It is to be noted that varying the wall thickness D is nothing but varying the cross sectional area. Thus, it may be said that varying the cross sectional area accomplishes the desired distribution of the pillar 7.

(Second Preferred Implementation)

Referring to FIGS. 9 to 14, a description is made as to the second preferred implementation according to the present invention.

The second preferred implementation is substantially the same as the first preferred implementation except the fact that the end walls 7a are thinned. FIGS. 10 to 14 illustrate the cross sectional profiles at different vertical heights of the pillar 7. The desired distribution of strength of the pillar 7 is accomplished by varying the thickness of peripheral wall 7b. Specifically, at the different vertical heights, the peripheral wall 7b has different values D1, D2, D3, D4, D5 in thickness, where D1>D2>D3>D4>D5.

As compared to the thickness of the peripheral wall 7b, the end walls 7a are thinned. Specifically, at the different vertical heights, the thickness of each of the end walls 7a is less than the thickness of the peripheral wall 7b.

In the same manner as mentioned before in connection with FIGS. 3A, 3B and 5, the pillar 7 is subject to a great reduction in thickness of its peripheral wall 7b toward the lower structure portion 17 from the upper structure portion 16 at the transition point 15.

In the first preferred implementation, the end walls 7a and the peripheral wall 7b of the pillar 7 has a common thickness at each of different vertical heights. According to the second preferred implementation, the thickness of the end walls 7a is reduced because it has little effectiveness in strength when the pillar 7 bears load during application of the force F. Thus, with the same strength, the second preferred implementation could achieve a reduction in weight of a front door latch pillar as compared to the first preferred implementation.

(Third Preferred Implementation)

Figure 15:
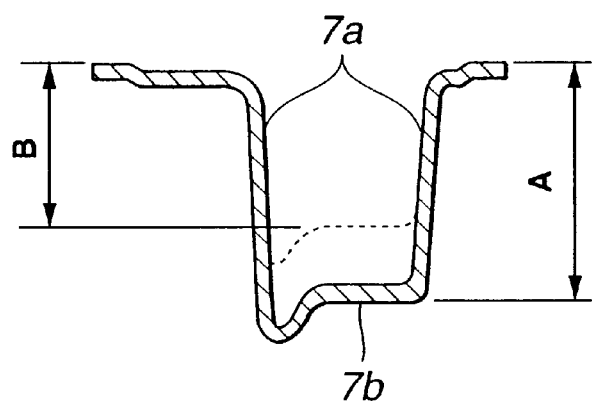
FIG. 15 is a cross section corresponding to that of FIG. 11, illustrating a third preferred implementation of the present invention.
Figure 16:
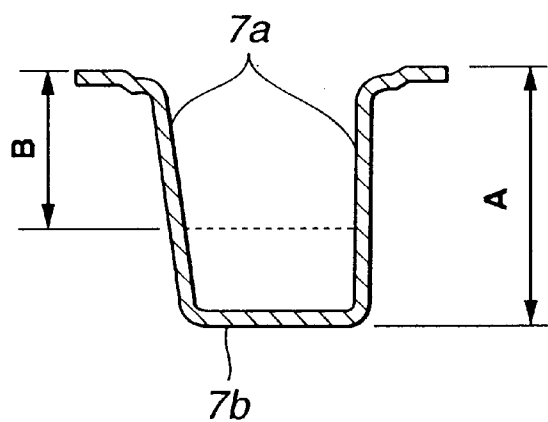
FIG. 16 is a cross section corresponding to that of FIG. 12, illustrating the third preferred implementation of the present invention.

Referring to FIGS. 15 and 16, a description is made on the third preferred implementation of the present invention. In FIGS. 15 and 16, the reference character A represents a distance over which each of end walls 7a extends towards the passenger compartment from a peripheral wall 7b at each of different vertical heights of the third preferred implementation of a front door latch pillar. In these Figures, the reference character B represents a distance over which each of the end walls 7a extends towards the passenger compartment from the peripheral wall 7b at each of the different vertical heights of the second preferred implementation illustrated in FIGS. 9–14. In the previously described second embodiment, the height B remains unaltered over the entire longitudinal length of the pillar 7 and the peripheral wall 7b is thickened over the upper structure portion 16 and thinned over the lower structure portion 17. According to the third preferred implementation, the desired distribution of strength is accomplished by varying the section modulus of the front door latch pillar. Gradually decreasing the distance A over which the end walls 7a extend toward the lower end from the upper end provides varying section modulus. The height A and/or thickness of the pillar wall determine the section modulus. In the second preferred implementation, the distance B is unaltered and the thickness of the peripheral wall 7b is altered, while in the third preferred implementation, the thickness of the pillar walls is unaltered and the height A is altered.

In the third preferred implementation, the position or the vertical height of a transition point 15 are the same as the transition point 15 of the second preferred implementation. The section modulus is subject to a great reduction toward the lower structure portion from the upper structure portion at the transition point 15.

According to the third preferred implementation, substantially the same function and effectiveness as those of the first and second preferred implementations are given. As compared to the first and second preferred implementation, the third preferred implementation has a greater cross sectional area, but provides a more reduction in weight as well as the same distribution of strength.

(Fourth Preferred Implementation)

Figure 17:
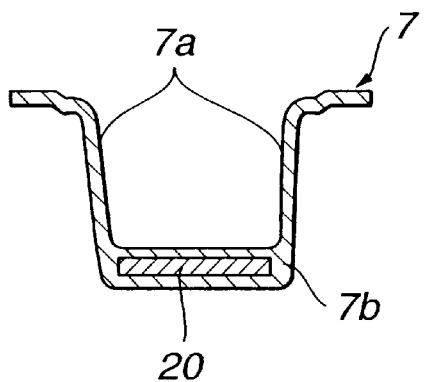
FIG. 17 is a cross section of an upper structure portion of a front door latch pillar, illustrating a fourth preferred implementation of the present invention.

Referring to FIG. 17, a description is made on the fourth preferred implementation of the present invention. The fourth preferred implementation of a front door latch pillar 7 is substantially the same as each of the preceding embodiments, but it is different from the latter in the construction of an upper structure portion (16, see FIG. 3A). FIG. 17 illustrates a feature of the construction of the upper structure portion that extends between an upper end of the pillar 7 and a transition point (15, see FIGS. 3A, 5, and 6). A lower structure portion (17, see FIG. 3A) of this pillar 7 may take the same form as that of the first or second or third preferred implementation. The upper structure portion (16, see FIG. 3A) of the pillar 7 has a reinforcement member 20 formed of an appropriate material, such as, for example, steel, embedded in a peripheral wall 7b over at least a portion of the entire vertical length thereof. The reinforcement member 20 is inserted into a die or mold for casting and forms a part of the peripheral wall 7b of the upper structure portion.

According to the fourth preferred implementation, the strength of the lower structure portion (17, see FIG. 3A) is sufficiently less than the strength of the upper structure portion (16, see FIG. 3A). Thus, when the pillar 7 withstands heavy loads during application of the force F (see FIGS. 7 and 8), the lower structure portion that is not provided with a reinforcement member is deformed inwardly into the passenger compartment more than the upper structure portion is. The upper structure portion of the front door latch pillar is less deformed than the lower structure portion so that it may not interfere with seat occupants within the passenger compartment. The impact on the seat occupants is suppressed to a sufficiently low level owing to the absorption of energy by positive deformation of the lower structure portion.

According to the fourth preferred implementation, sufficiently high strength is given to the upper structure portion of the pillar 7 by means of the reinforcement member 20, thus minimizing the interference with the seat occupants within the passenger compartment. The use of the reinforcement member 20 has made it possible to realize the desired distribution of strength without relying on the construction of light metal alloy alone. In the illustrated example of FIG. 17, the reinforcement member 20 is in the form of an elongate plate that extends over the entirety of the longitudinal length of the upper structure portion. Varying the thickness and/or the cross sectional area of the reinforcement member 20 against various positions along the longitudinal line of the upper structure portion accomplish realization of the desired distribution of strength as shown in FIG. 6.

(Fifth Preferred Implementation)

Figure 18:
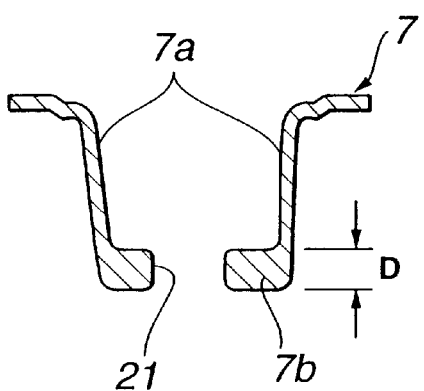
FIG. 18 is a cross section of the portion of a front door latch pillar that is formed with a tool hole, illustrating a fifth preferred implementation of the present invention.

Referring to FIG. 18, a description is made on the fifth preferred implementation of the present invention. As shown in FIG. 18, the front door latch pillar 7 according to the first, second, third, or fourth embodiment has the portion formed with a tool hole 21 thickened as shown at D.

The thickness of this thickened portion D may be increased to a desired level to provide the requisite strength at this portion around the tool hole 21 because the front door latch pillar 7 is formed by casting technique. The desired distribution of strength over the entirety of the front door latch pillar 7 is not deteriorated by the provision of a tool hole.

(Sixth Preferred Implementation)

Figure 19:
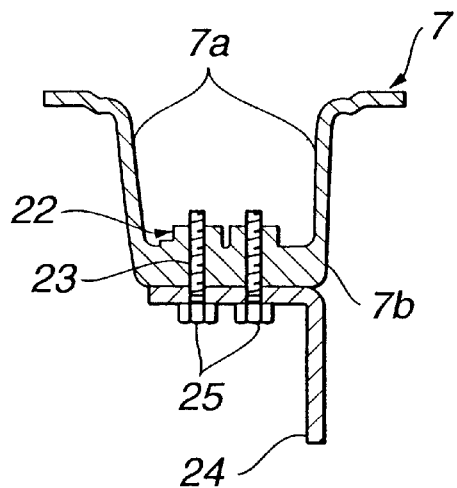
FIG. 19 is a cross section of a front door latch pillar that is integrally formed with a portion which a door hinge plate is attached to, illustrating a sixth preferred implementation of the present invention.

Referring to FIG. 19, a description is made on the sixth preferred implementation of the present invention. As shown in FIG. 19, a front door latch pillar 7 according to the first, second, third, fourth or fifth preferred implementation is integrally formed, by light metal alloy, with a door hinge mount site 22 by casting technique. The mount site 22 is formed with tapped holes 23 and has portions where the tapped holes 23 are thickened. Using these tapped holes 23, a door hinge plate 24 are fixedly attached to the mount site 22 by means of bolts 25.

According to the sixth preferred implementation, the area where the tapped holes 23 are formed is reinforced without any separate reinforcement measure. Thus, work associated with attachment of a reinforcement plate is no longer needed.

(Seventh Preferred Implementation)

Figure 20:
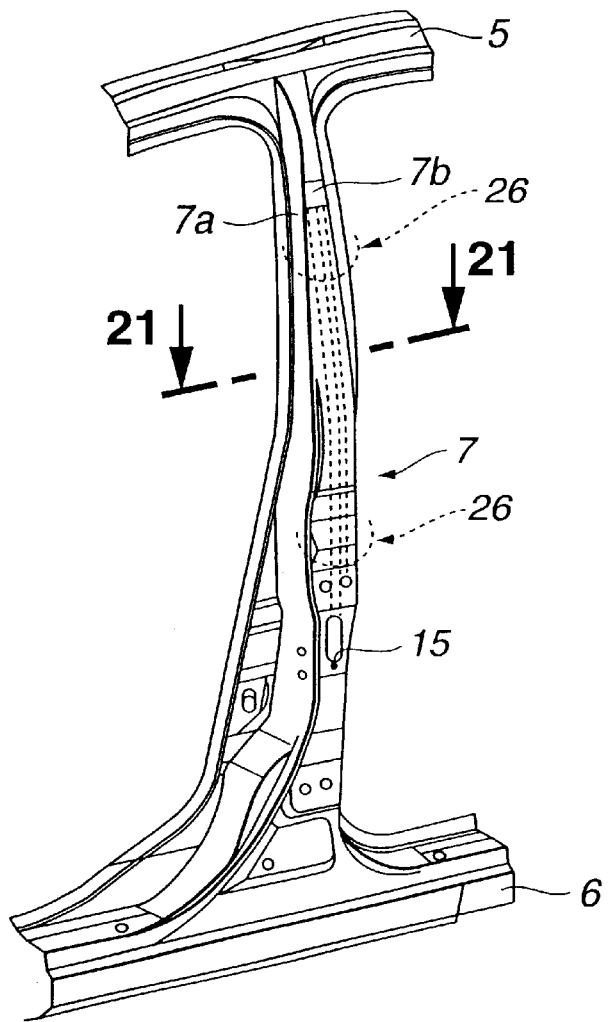
FIG. 20 is a similar view to FIG. 9, illustrating a seventh preferred implementation of the present invention.
Figure 21:
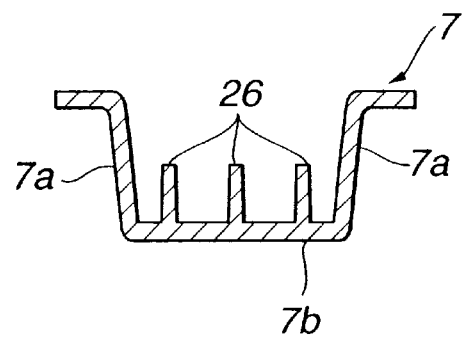
FIG. 21 is a cross section taken through the line 21—21 in FIG. 20.

Referring to FIGS. 20 and 21, a description is made on the seventh preferred implementation of the present invention. According to this preferred implementation, a plurality of integral inner vertical ribs 26 extend over a major portion of the entirety of the longitudinal length of an upper structure portion of a front door latch pillar 7 above a transition point 15 to provide the requisite strength for withstanding heavy loads. A lower structure portion below the transition point 15 has strength less than the strength of the upper structure portion in the same manner as any of the proceeding preferred implementation. The inner vertical ribs 26 are formed on the inner surface of a peripheral wall 7b of the pillar 7.

Figure 22:
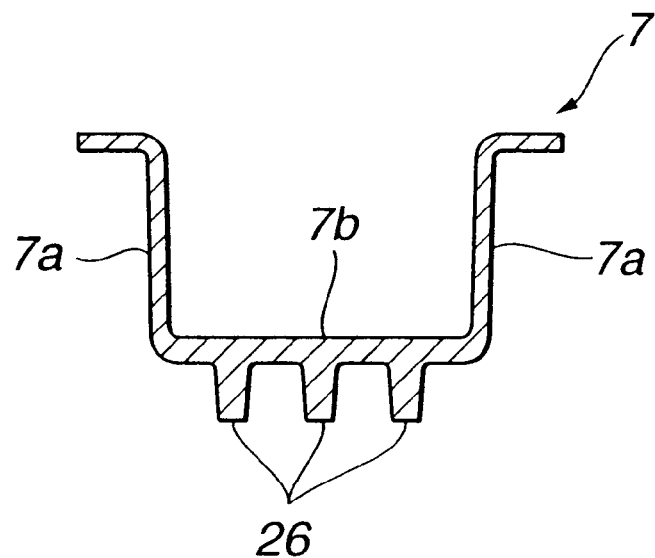
FIG. 22 is a similar view to FIG. 21, illustrating a first modification of the seventh preferred implementation of the present invention.

FIG. 22 illustrates a cross section of an upper structure portion of a front door latch pillar 7, illustrating the first modification of the seventh preferred implementation. Instead of the inner vertical ribs 26 (see FIG. 21), a plurality of integral outer vertical ribs 26 are formed on the outer surface of a peripheral wall 7b of the upper structure portion. The outer vertical ribs 26 extend over a major portion of the entirety of the longitudinal length of the upper structure portion.

Figure 23:
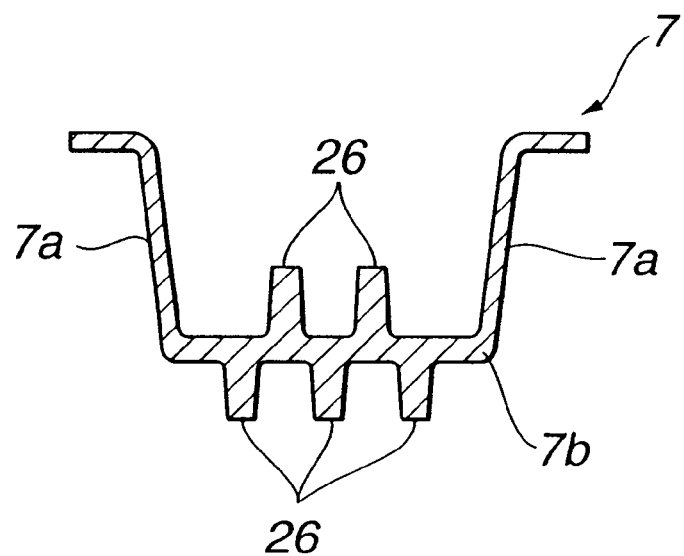
FIG. 23 is a similar view to FIG. 21, illustrating a second modification of the seventh preferred implementation of the present invention.

FIG. 23 illustrates a cross section of an upper structure portion of a front door latch pillar 7, illustrating the second modification of the seventh preferred implementation. In addition to the inner vertical ribs 26 (see FIG. 21), a plurality of integral outer vertical ribs 26 are formed on the outer surface of a peripheral wall 7b of the upper structure portion. Both the inner and outer vertical ribs 26 extend over a major portion of the entirety of the longitudinal length of the upper structure portion.

According to the seventh preferred implementation and its first and second modifications thereof, the provision of vertical ribs 26 on the upper structure portion provides the desired distribution of strength. Any desired cross sectional profile of each of the vertical ribs 26 may be easily formed by casting technique. The overall surface of the front door latch pillar 7 is enlarged owing to the vertical ribs 26 to provide efficient cooling, thus accomplishing stable speed of cooling in the process of casting.

With regard to the seventh preferred implementation and its first and second modifications, varying the thickness and cross sectional area of the vertical ribs 26 against various positions along the longitudinal line of the upper structure portion gives the desired distribution of strength as shown in FIG. 6.

(Eighth Preferred Implementation)

Figure 24:
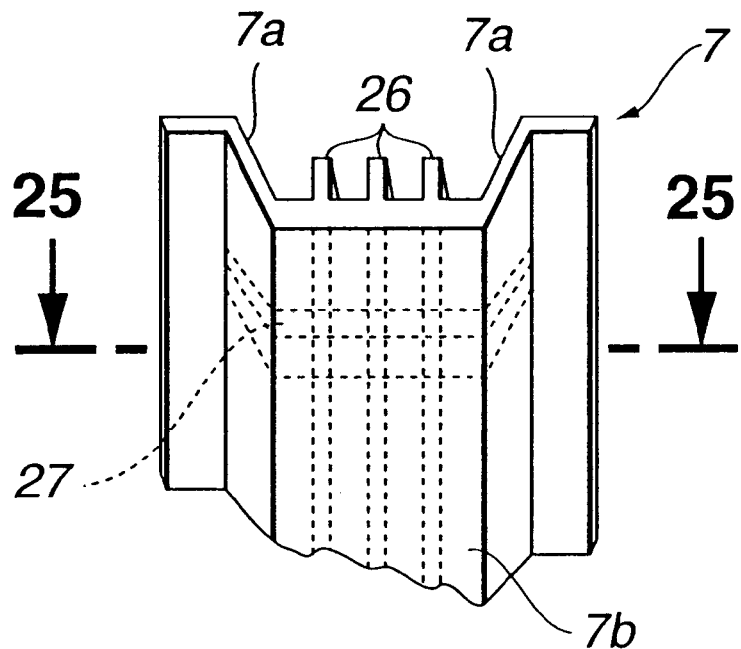
FIG. 24 is a fragmentary perspective view of an upper structure portion of a front door latch pillar, illustrating an eighth preferred implementation of the present invention.
Figure 25:
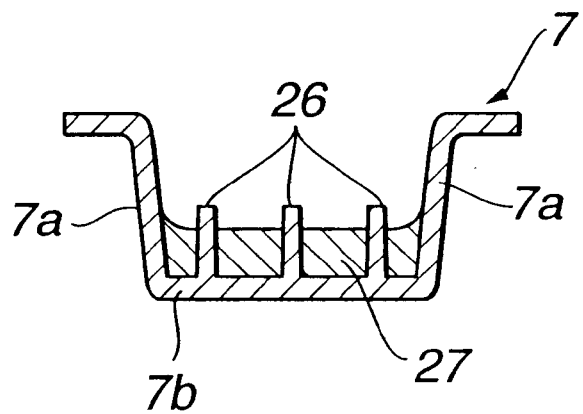
FIG. 25 is a cross section taken through the line 25—25 in FIG. 24.
Figure 26:
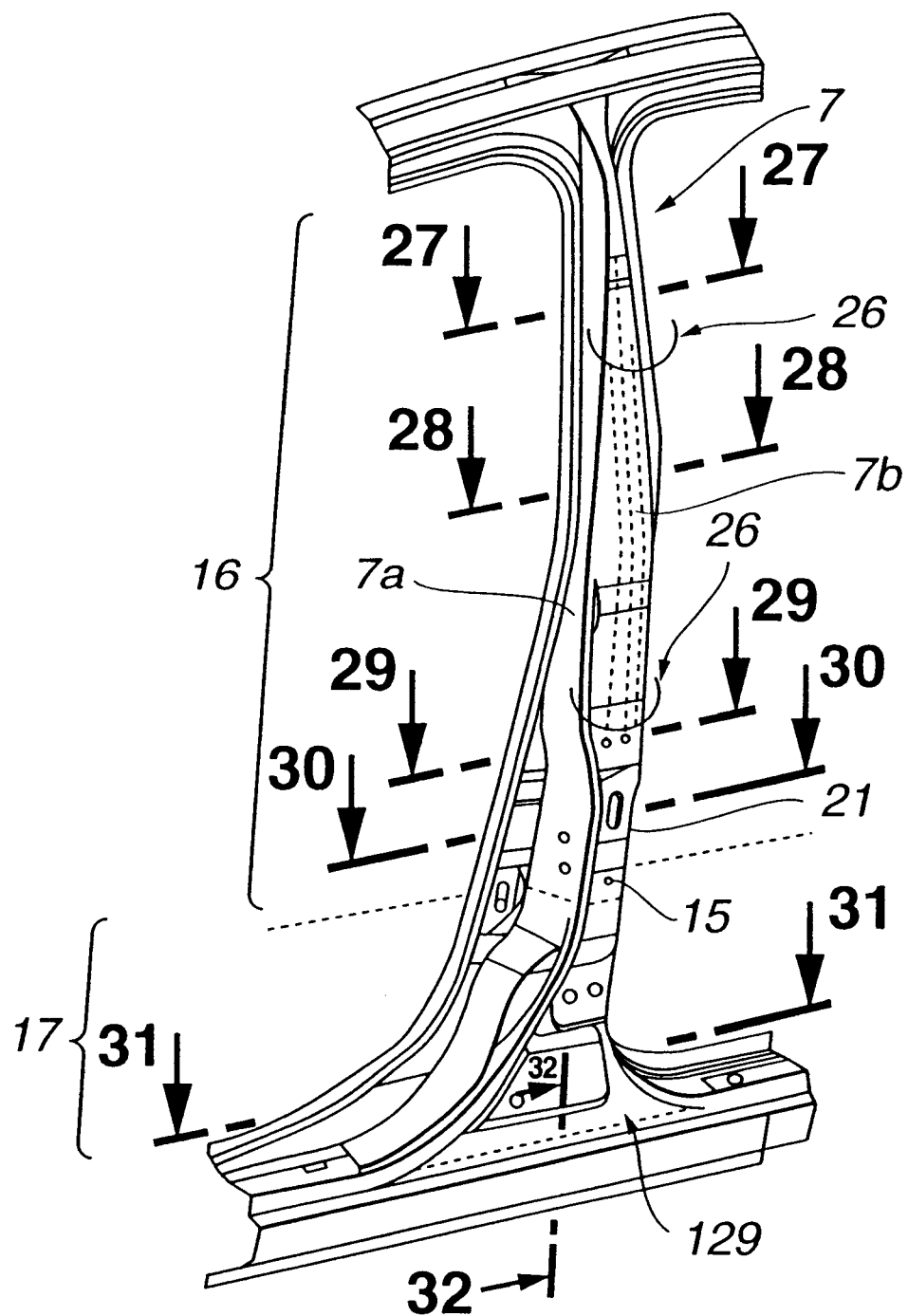
FIG. 26 is a similar view to FIG. 9, illustrating a ninth preferred implementation of the present invention.

Referring to FIGS. 24 and 25, a description is made on the eighth preferred implementation of the present invention. This eighth preferred implementation is substantially the same as the seventh preferred implementation except the provision of at least one transverse rib 27 that extends across the vertical ribs 26 and bridges end walls 7a. The transverse rib 27 is integrally formed on an upper structure portion of a front door latch pillar 7 by casting technique.

The provision of a groove for the transverse rib 27 in a die or mold facilitates flow of molten light metal alloy into grooves for forming the vertical ribs 26, resulting in a quick even distribution of molten light metal alloy over the entirety of the die. This results in producing front door latch pillars with little product-by-product variation in shape and with good mechanical property. The transverse rib 27 provides increased strength in interconnecting the vertical ribs 26.

In each of the preceding preferred implementations of the present invention, the present invention is applied to a front door latch pillar. However, the present invention is not limited to this application. The present invention may be applicable to pillars of other types.

In the preceding preferred implementations of the present invention, the desired distribution of strength of a front door latch pillar is realized by varying the thickness of walls of a front door latch pillar or the cross sectional area thereof or the thickness of a peripheral wall or the section modulus of a front door latch pillar alone. Any combination of such measures may be used to provide the desired distribution of strength of a front door latch pillar.

(Ninth Preferred Embodiment)

Referring to FIGS. 26 through 34, a description is made on the ninth preferred implementation of the present invention. This ninth preferred implementation is substantially the same as the seventh preferred implementation illustrated in FIGS. 20 and 21.

However, the ninth preferred implementation is different from the seventh preferred implementation in the proportion of protrusions by which the inner vertical ribs 26 extend toward the passenger compartment. In the seventh preferred implementation, the two inner vertical ribs 26 located in the neighborhood of the two end walls 7a, respectively, extend toward the passenger compartment as much as the other intermediate inner vertical rib 26 does as readily seen from FIG. 21. According to the ninth preferred implementation, two inner vertical ribs 26a and 26c located in the neighborhood of two end walls 7a, respectively, extend less than the other intermediate inner vertical rib 26b does as seen in FIG. 28. As seen from FIGS. 27 and 33, the two inner vertical ribs 26a and 26c in the neighborhood of the two end walls 7a merge smoothly into the two end walls 7a, respectively, at overlapping portions 128 near an upper end of a front door latch pillar 7. As seen from FIGS. 26 and 32, the front door latch pillar 7 has a horizontal rib 129 lying near its boundary with the side sill.

Further, the ninth preferred implementation is different from the seventh preferred implementation in the distribution of thickness of the peripheral wall 7b of the front door latch pillar 7 over the vertical length thereof. In the seventh preferred implementation, the vertical inner ribs 26 alone are relied upon to increase the strength of the upper structure portion 16 as compared to the strength of the lower structure portion 17. According to the ninth preferred implementation, an upper structure portion 16 has its peripheral wall 7b thickened, while a lower structure portion 17 has its peripheral wall thinned. Thus, the vertical ribs 26a, 26b and 26c as well as the thickened peripheral wall 7b are used to increase the strength of the upper structure portion 16.

Figure 32:
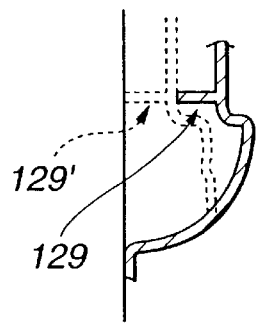
FIG. 32 is a cross section taken through the line 32—32 in FIG. 26.

Referring to FIG. 32, when the front door latch pillar 7 withstands heavy loads during the application of force F (see FIGS. 7 and 8), the lower structure portion 17 is deformed inwardly towards the passenger compartment. In the process, the horizontal rib 129 comes into abutting relationship with the inner side structure element (see the dotted line in FIG. 32), thus controllably restraining the amount of inward deformation of the lower structure portion 17.

Figure 27:
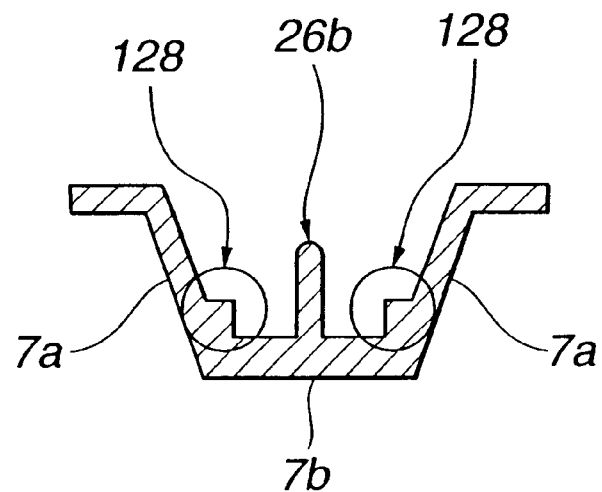
FIG. 27 is a cross section taken through the line 27—27 in FIG. 26.
Figure 28:
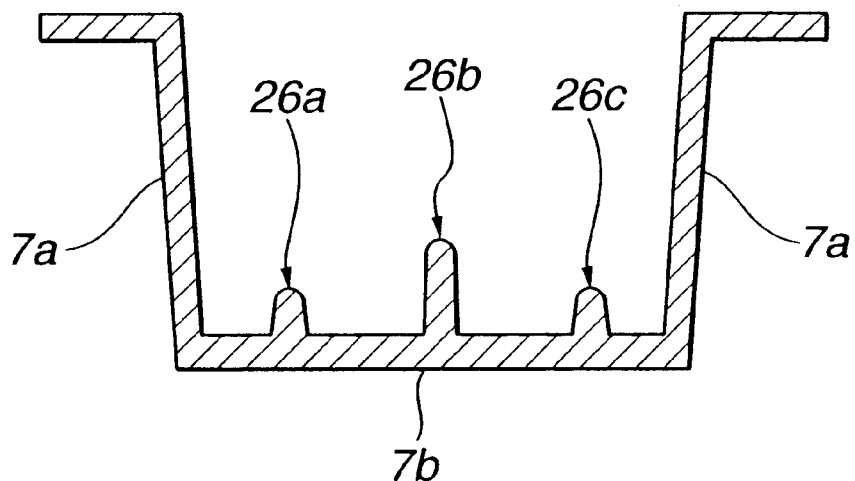
FIG. 28 is a cross section taken through the line 28—28 in FIG. 26.
Figure 29:
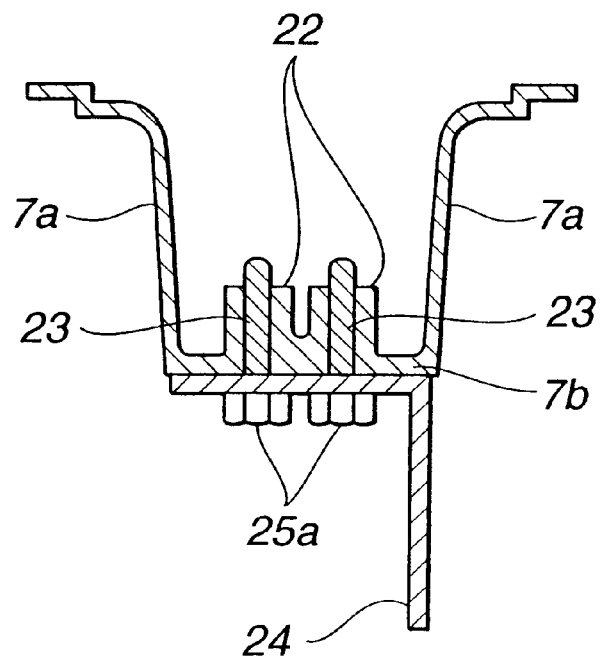
FIG. 29 is a cross section taken through the line 29—29 in FIG. 26.
Figure 30:
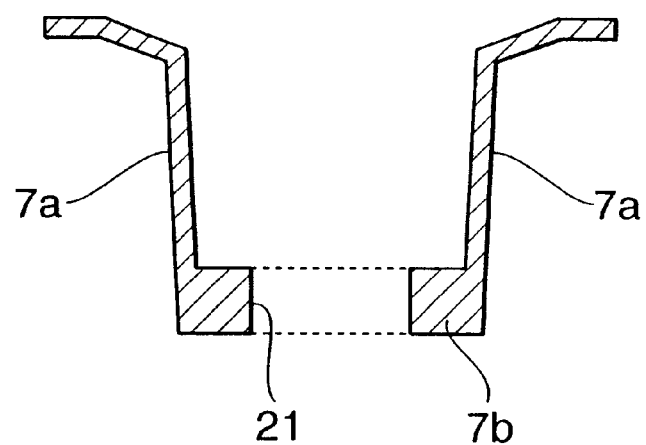
FIG. 30 is a cross section taken through the line 30—30 in FIG. 26.
Figure 31:
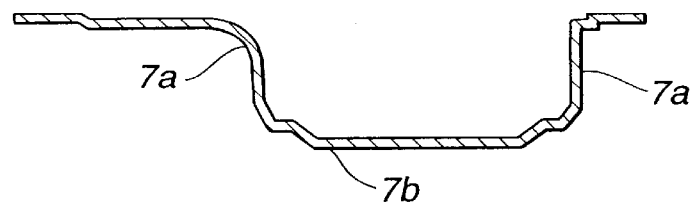
FIG. 31 is a cross section taken through the line 31—31 in FIG. 26.
Figure 33:
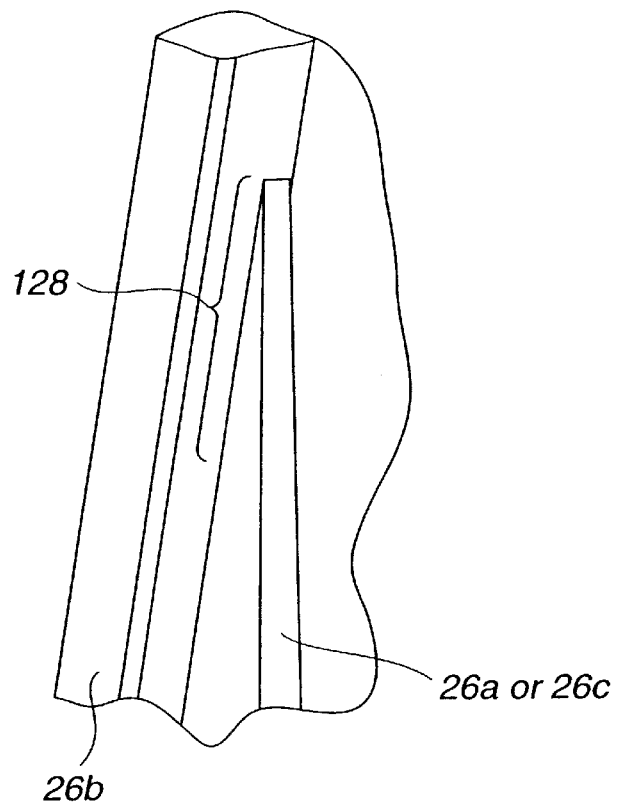
FIG. 33 is a fragmentary perspective view of a front door latch pillar, illustrating a vertical inner rib merging into one of end walls.
Figure 34:
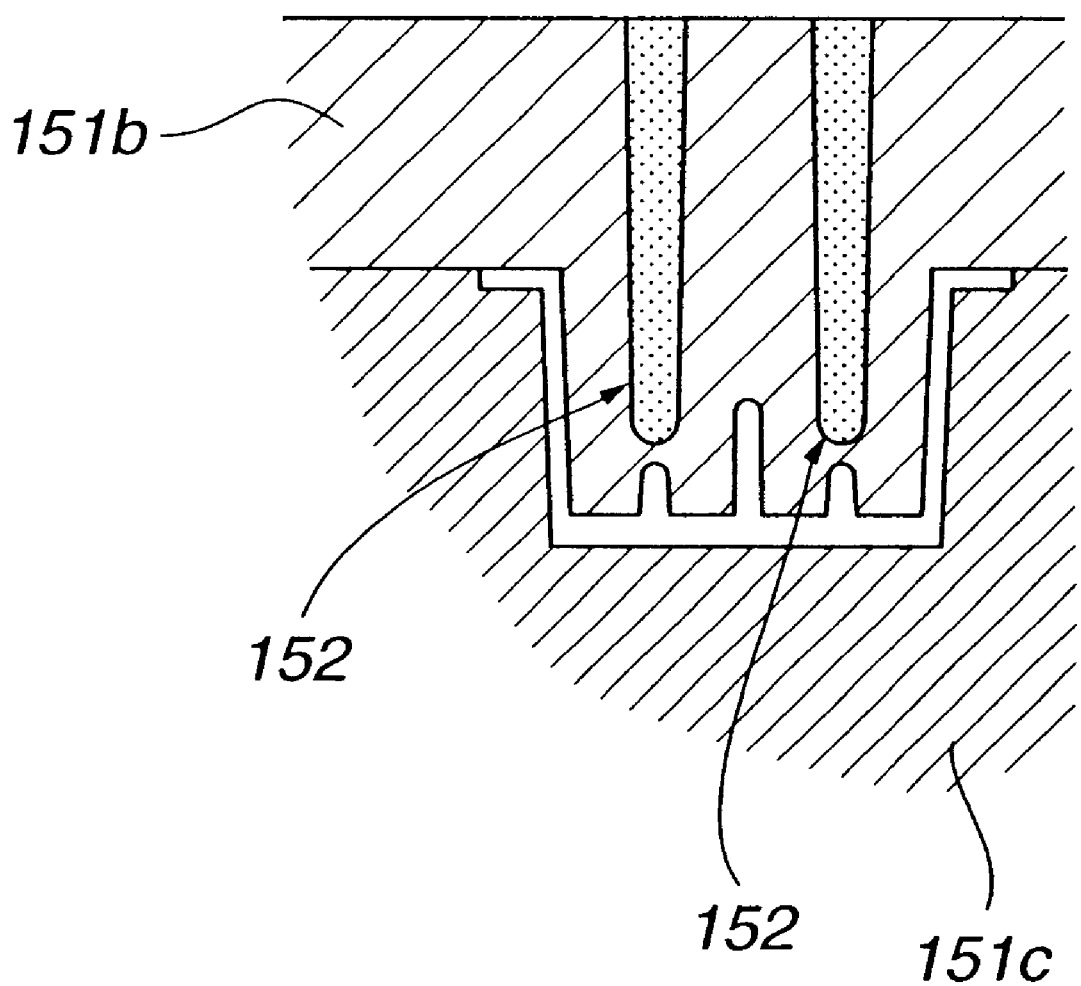
FIG. 34 is a cross section of a die or mold for forming the shape of the front door latch pillar shown in FIG. 28.

Referring to FIGS. 27 and 33, the overlapping portions 128 where the two vertical ribs 26a and 26c connect with the end walls 7a provide a path through which stress is transmitted from the vertical ribs 26a and 26c to the end walls 7a, thus providing better distribution of stress. FIG. 34 illustrates a die or metallic mold 151b and 151c. As mentioned before, the two vertical ribs 26a and 26c located in the neighborhood of the two end walls extend less than the intermediate vertical rib. This allows the provision of a cooling system 152 that extends more deeply toward a gap where the peripheral wall 7b is to be formed. This cooling arrangement makes it possible to control the rate of cooling the vertical ribs, thus improving the cooling efficiency in casting.

(Tenth Preferred Implementation)

Figure 35:
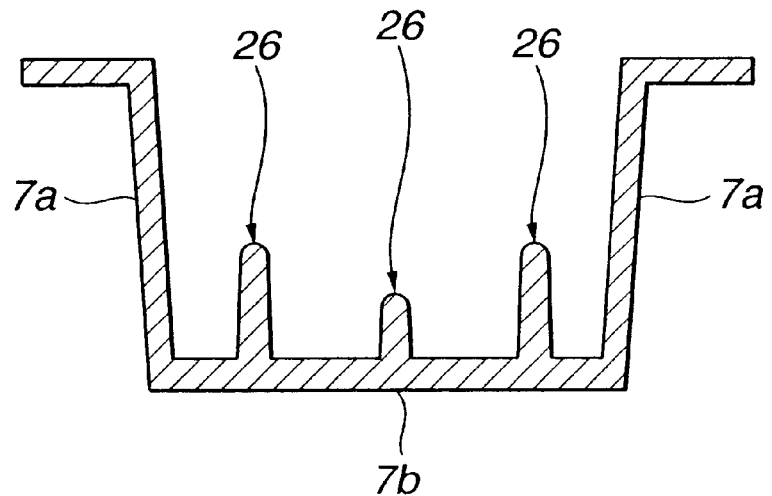
FIG. 35 is a similar cross section to FIG. 28, showing a tenth preferred implementation of the present invention.

Referring to FIG. 35, a description is made on the tenth preferred implementation of the present invention. This tenth preferred implementation is substantially the same as the ninth preferred implementation except the proportion of inner vertical ribs 26. As shown in FIG. 35, an intermediate inner vertical rib 26 extends toward the passenger compartment less than the other inner vertical ribs 26 do. This allows the cooling system 152 (see FIG. 34) to extend deeply toward the peripheral wall 7b.

(Eleventh Preferred Implementation)

Figure 36:
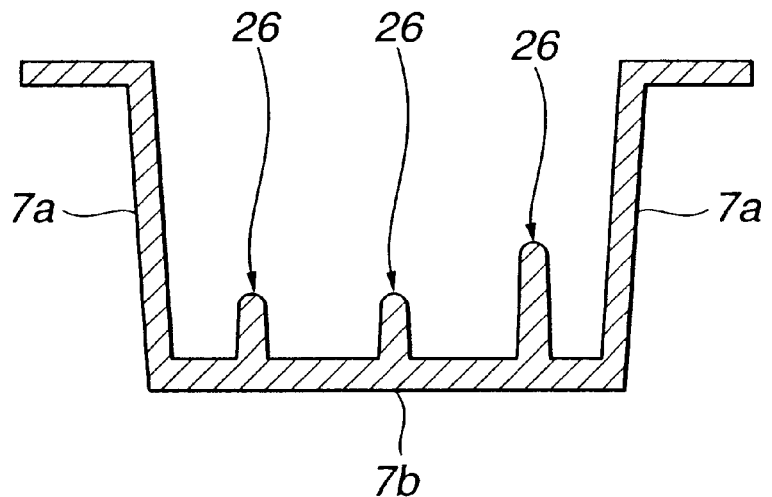
FIG. 36 is a similar cross section to FIG. 28, showing a an eleventh preferred implementation of the present invention.

Referring to FIG. 36, a description is made on the eleventh preferred implementation of the present invention. This eleventh preferred implementation is substantially the same as the ninth preferred implementation except the proportion of inner vertical ribs 26. As shown in FIG. 36, two inner vertical ribs including an intermediate inner vertical rib 26 extend toward the passenger compartment less than the other inner vertical rib 26 does. This allows the cooling system 152 (see FIG. 34) to extend deeply toward the peripheral wall 7b.

(Twelfth Preferred Implementation)

Figure 37:
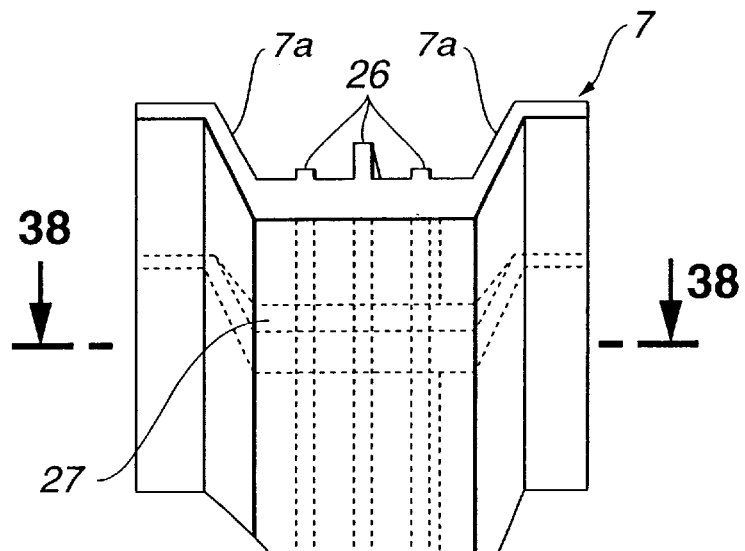
FIG. 37 is a fragmentary perspective view of a front door latch pillar showing a cross section similar to FIG. 28, illustrating a twelfth preferred implementation of the present invention.
Figure 38:
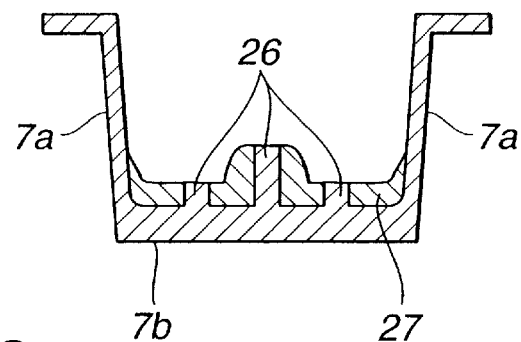
FIG. 38 is a cross section taken though the line 38—38 in FIG. 37.

Referring to FIGS. 37 and 38, a description is made on the twelfth preferred implementation of the present invention.

This twelfth preferred implementation is substantially the same as the ninth preferred implementation expect the provision of at least one transverse rib 27. The function and effectiveness of the provision of such transverse rib are the same as those described in connection with FIGS. 24 and 25.

(Thirteenth Preferred Implementation)

Figure 39:
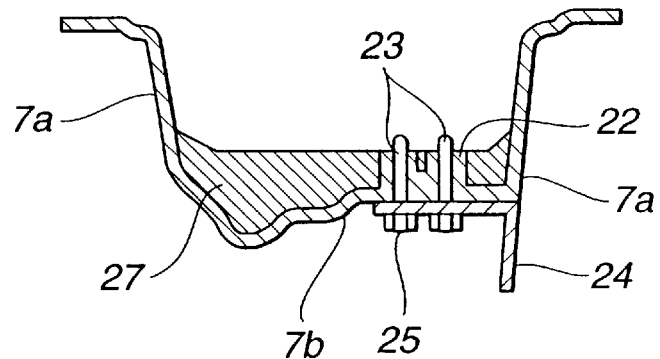
FIG. 39 is a cross section similar to FIG. 29, illustrating a thirteenth preferred implementation of the present invention.

Referring to FIG. 39, a description is made on the thirteenth preferred implementation of the present invention. This thirteenth preferred implementation is substantially the same as the ninth preferred implementation except the provision of an integrally formed transverse rib 27. The transverse rib 27 bridges the end walls 7a and the thickened door hinge mount site 22. This transverse rib 27 provides distribution of stress applied to a door hinge plate 24 toward the end walls 7a, resulting in an increase in rigidity of the door hinge.

(Fourteenth Preferred Implementation)

Figure 40:
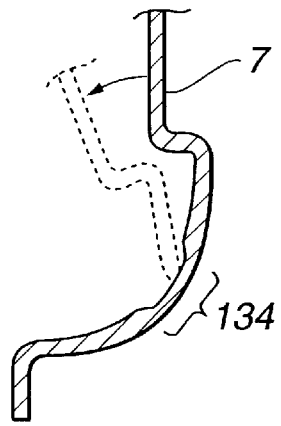
FIG. 40 is a cross section similar to FIG. 32, illustrating a fourteenth preferred implementation of the present invention.
Figure 41:
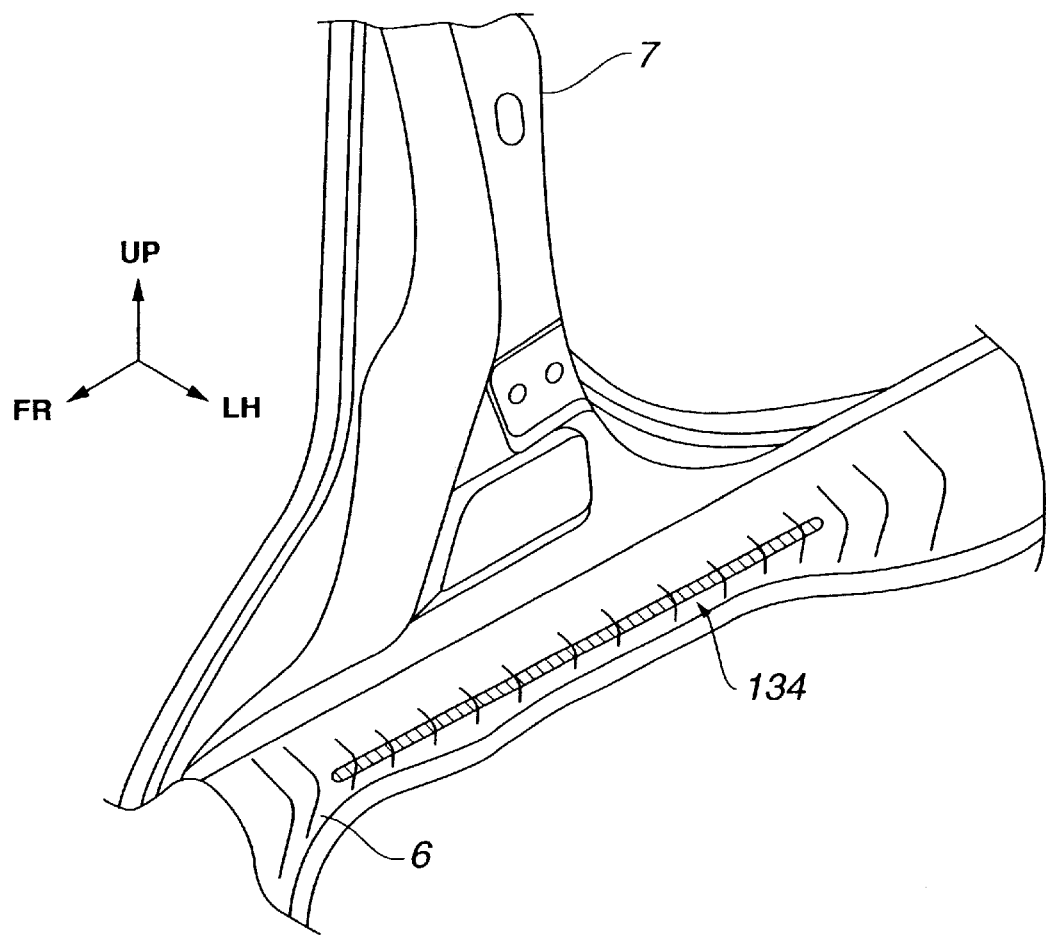
FIG. 41 is a fragmentary perspective view illustrating a lower structure portion of a front door latch pillar and the adjacent side sill after deformation during a side impact.

Referring to FIGS. 40 and 41, a description is made on the fourteenth preferred implementation of the present invention. This fourteenth preferred implementation is substantially the same as the ninth preferred implementation except the provision of a structurally deformable zone 134. As best seen in FIG. 40, this zone 134 is formed in the neighborhood of a corner portion of a cross section of the side sill 6. In this example, the zone 134 occupies a rectangular elongate area lying along the longitudinal centerline of the vehicle and is formed by thinning the wall over the entirety of the rectangular elongate area. Referring to FIG. 41, during a side impact, the structurally deformable zone 134 is deformed to allow an upper part of the side sill 6 to tilt inwardly about a longitudinal line passing through the zone 134, causing the side sill 6 to be crushed uniformly at an area adjacent the lower end of the front door latch pillar 7. Selecting the thickness of the thinned wall of the structurally deformable zone 134 results in controlling deformation mode and reaction during a side impact.

(Fifteenth Preferred Implementation)

Figure 42:
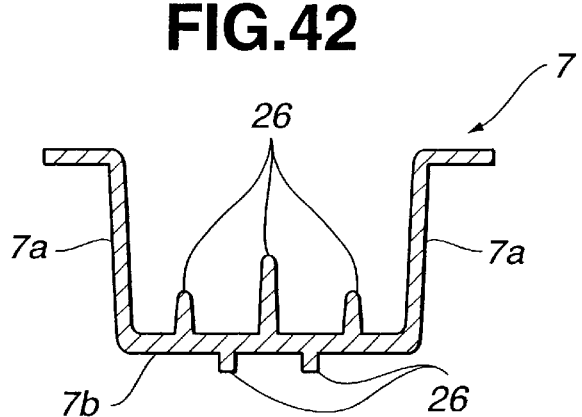
FIG. 42 is a cross section similar to FIG. 28, illustrating a fifteenth preferred implementation of the present invention.

Referring to FIG. 42, a description is made on the fifteenth preferred implementation of the present invention. This fifteenth preferred implementation is substantially the same as the ninth preferred implementation except the provision of vertically extending outer ribs 26 on the outer surface of a peripheral wall 7b of an upper structure portion 16 of a front door latch pillar 7. The addition of the outer ribs 26 results in an increase of section modulus of the upper structure portion 16. Besides, the cooling efficiency in casting increases because of an increase in the surface area of a product.

(Sixteenth Preferred Implementation)

Referring to FIGS. 43 to 52, a description is made on the sixteenth preferred implementation of the present invention.

Figure 43:
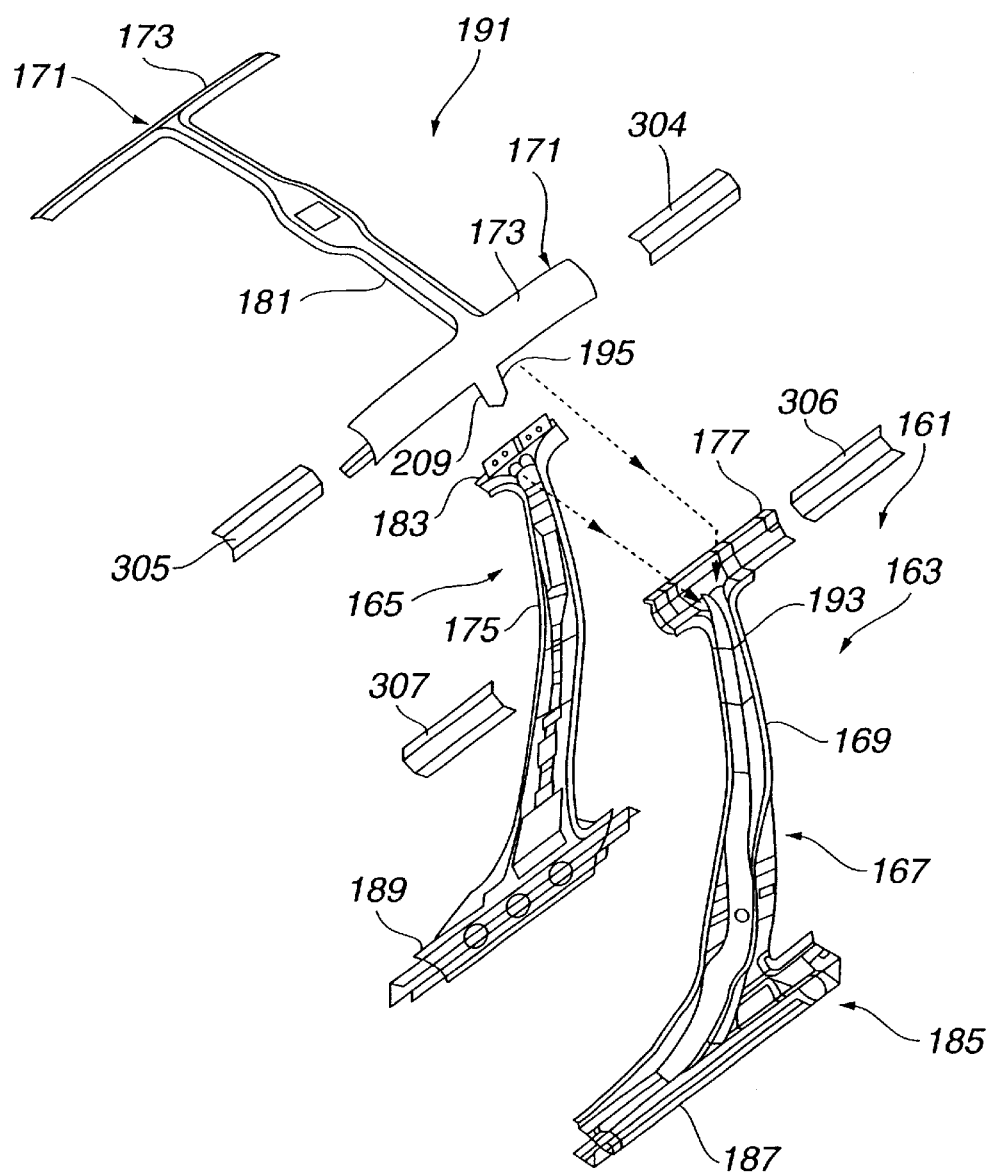
FIG. 43 is an exploded view a front door latch pillar with a bored roof, illustrating a sixteenth preferred implementation of the present invention.

Referring to FIG. 43, a front door latch pillar 167 includes a pillar outer half 169 and a pillar inner half 175. The pillar outer half 169 is integrally formed with a side roof rail inner half 177 of a side roof rail 171. A side roof rail outer half 173 of the side roof rail 171 is integrally formed with a bored roof 181. At an upper end, the pillar inner half 175 has an integral joining site 183 only. At a lower end, the pillar outer half 169 has an integrally formed side sill outer half 187 of a side sill 185. At a lower end, the pillar inner half 175 has an integrally formed side sill inner half 189 of the side sill 185.

The side roof rail inner half 177 and the side sill outer half 187 have fixedly joined thereto the associated separate elements, respectively. Cooperating with the associated elements, they extend in the vehicle longitudinal direction or they may extend alone in the vehicle longitudinal direction, forming a part of a body side outer 163 of a body side structure 161. At front and rear ends, the side roof rail inner half 177 has joining sites, not shown, for connection with a front roof rail and a rear roof rail.

The side sill inner half 189 has fixedly joined thereto associated separate elements. Cooperating with the associated elements, the side sill inner half 189 extends in the vehicle longitudinal direction or it may extend alone in the vehicle longitudinal direction. The pillar inner half 175, joining site 183, and side sill inner half 189 cooperate with each other to form a part of a body side inner 165 of the body side structure 161.

The side roof rail outer half 173 of the side roof rail 171 has fixedly joined thereto associated separate elements. Cooperating with the associated elements, the side roof rail outer half 173 extends in the vehicle longitudinal direction or it may extend alone in the vehicle longitudinal direction. At a front end, the side roof rail outer half 173 has fixedly joined thereto or integrally formed therewith a front roof rail outer half 305. At a rear end, the side roof rail outer half 173 ha fixedly joined thereto or integrally formed therewith a rear roof rail outer half 304. They cooperate with each other to form a roof structure 191.

A front roof rail inner half 307 and a rear roof rail inner half 306 are formed as separate elements, respectively. They are connected to joining sites formed at front and rear ends of the side roof rail inner half 177.

The above-mentioned body side outer 163, body side inner 165, and roof structure 191 are castings of light metal, such as, aluminum alloy or magnesium alloy.

What may preferably be formed integrally into a single light metal casting include at least the front door latch pillar 167, a joining site of the side roof rail 171 with the pillar 167, a joining site of the side sill 185 with the pillar 167, a portion of the side roof rail 171 that extends from the joining site thereof, and a portion of the side sill 185 that extends from the joining site thereof.

Figure 44:
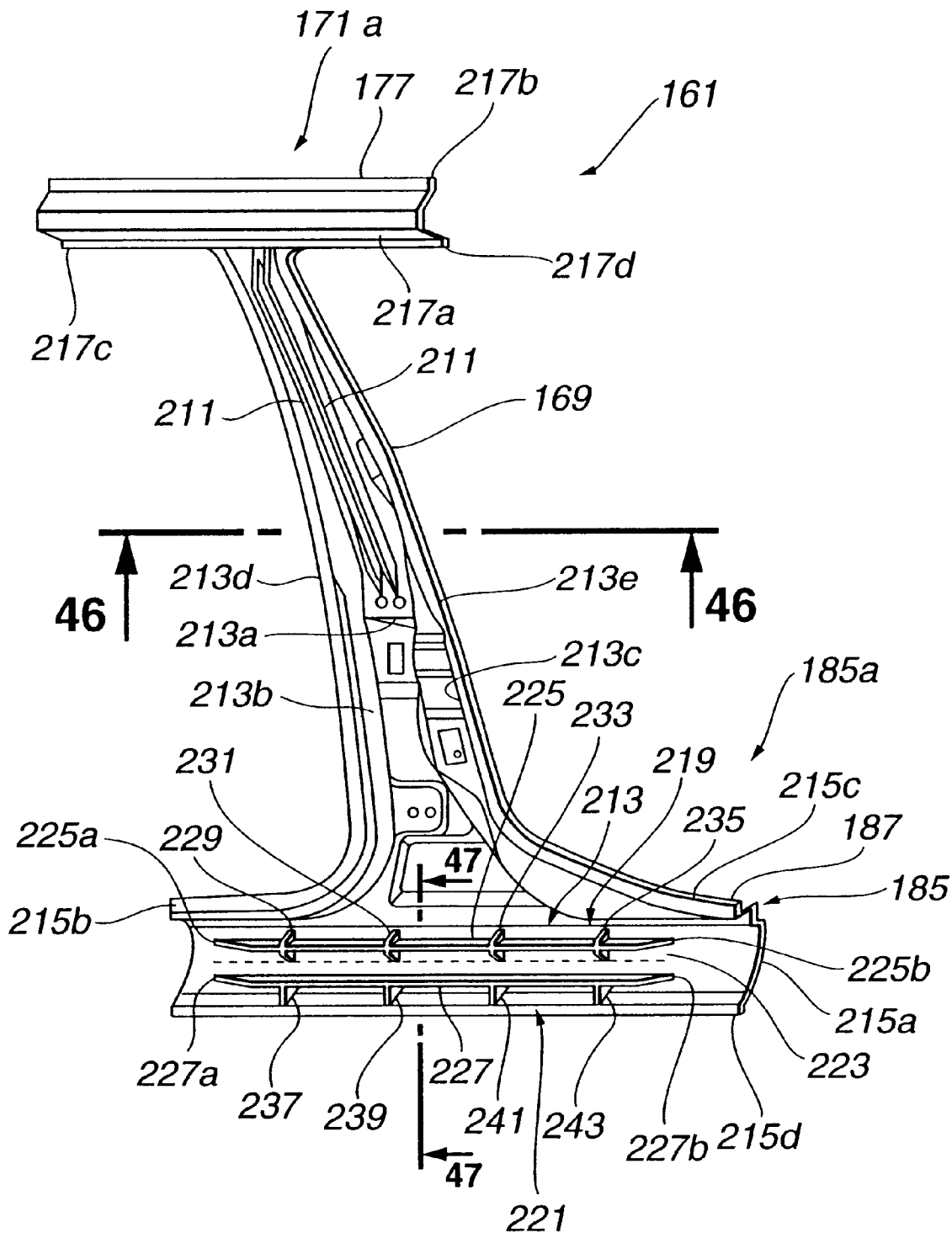
FIG. 44 is a perspective view of the front door latch pillar with its pillar inner half removed to show an inner structure of its pillar outer half.
Figure 45:
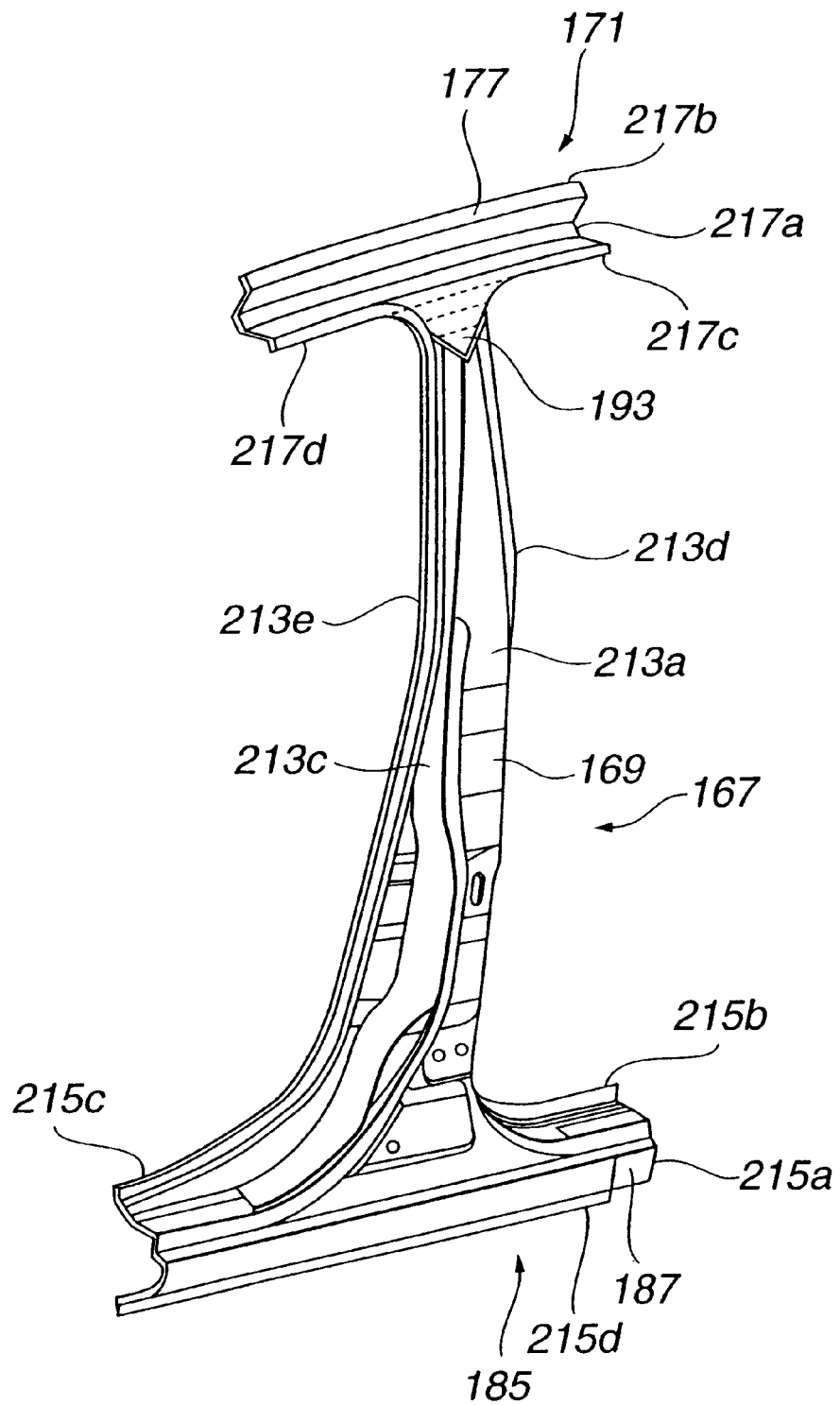
FIG. 45 is a perspective view of the front door latch pillar, showing the outer surface thereof.
Figure 46:
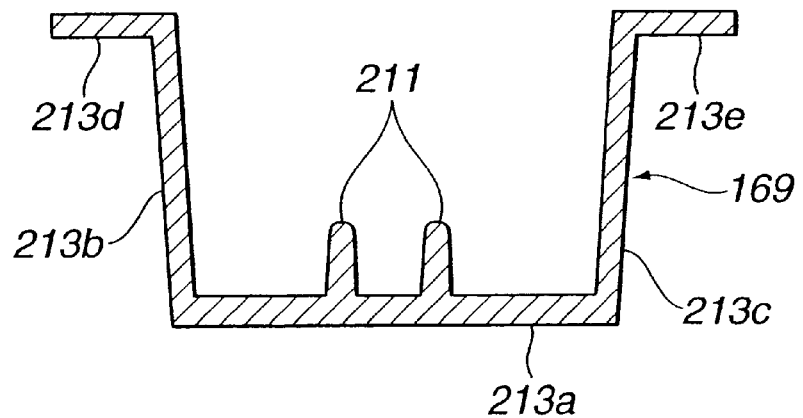
FIG. 46 is a cross section taken through the line 46—46 in FIG. 44.

Referring to FIGS. 44 to 46, similarly to the previously described seventh or thirteenth preferred implementation, the front door latch pillar 167 has integral vertical inner ribs 211. As best seen in FIG. 44, the outer half 169 of the pillar 167 is integrally formed with the vertical inner ribs 211. The vertical inner ribs 211 extend continuously from the inner portion 177 of the side roof rail 171 to a point slightly below a waist portion of the front door latch pillar 167.

Similarly to the structurally deformable zone 134 of the fourteenth preferred implementation shown in FIGS. 41 and 42, the side sill 185 is formed with a structurally deformable zone 223 as best seen in FIG. 44.

Referring to FIGS. 44 and 45, the side sill outer half 187 of the side sill 185 is integrally formed with a sill strength adjusting lo structure 213. The sill strength adjusting structure 213 is provided to allow inward displacement of a joining portion 185a of the side sill 185 with the front door latch pillar 167 when the front door latch pillar 167 withstand heavy loads during a side impact. The joining portion 285a includes a joining site with the front door latch pillar 167 and covers the adjacent area of the side sill 185 extending from the joining site along the vehicle longitudinal centerline.

The outer half 169 of the front door latch pillar 167 has two spaced end walls 213b and 213c interconnected by a peripheral wall 213a and joining flanges 213d and 213e. The joining flange 213d extends from the end wall 213b. The other joining flange 213e extends from the other end wall 213c.

Figure 47:
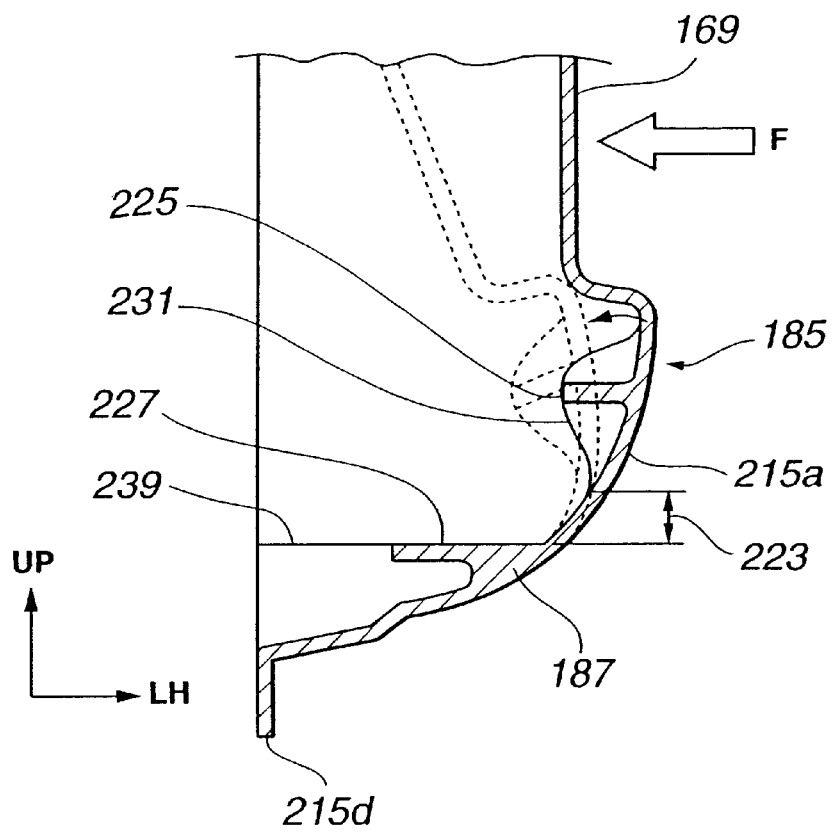
FIG. 47 is a fragmentary enlarged cross section taken through the line 47—47 in FIG. 44.

As best seen in FIG. 47, the outer half 187 of the side sill 185 is curved outwardly and has a peripheral wall 215a and a downwardly extending joining flange 215d. As best seen in FIG. 45, the outer half 187 of the side sill 185 has two upwardly extending joining flanges 215b and 215c. These joining flanges 215b and 215c connect smoothly into the flanges 213d and 213e, respectively.

Referring to FIGS. 44 and 45, the inner half 177 of the side roof rail 171 has walls 217a defining a channel and an upper joining flange 217b and two lower joining flanges 217c and 217d. The joining flanges 217c and 217d connect smoothly into the flanges 213d and 213e, respectively.

Referring to FIGS. 44 and 47, the sill strength adjusting structure 213 includes vertically spaced upper and lower reinforcement elements 219 and 221, and the structurally deformable zone 223 between the upper and lower reinforcement elements 219 and 221. The upper reinforcement element 219 includes a horizontal rib 225 having two ends 225a and 225b. Between the ends 225a and 225b, the horizontal rib 225 has four spaced vertical ribs 229, 231, 233 and 235. Similarly, the lower reinforcement element 221 includes a horizontal rib 227 having two ends 227a and 227b. Between the ends 227a and 227b, the horizontal rib 227 has four spaced vertical ribs 237, 239, 241 and 243. The upper and lower horizontal ribs 225 and 227 are in parallel.

The upper and lower horizontal ribs 225 and 227 project from the inner surface of the peripheral wall 215a of the outer half 187 of the side sill 185. They extend along the vehicle longitudinal centerline from a joining portion of the side sill outer half 187 with the outer half 169 of the front door latch pillar 167 in both forward and rearward directions of the vehicle.

The upper horizontal rib 225 is tapered toward the ends 225a and 225b. Similarly, the lower horizontal rib 227 is tapered toward the ends 227a and 227b. The vertical ribs 229, 231, 233, and 235 of the upper horizontal rib 225 are vertically aligned with the vertical ribs 237, 239, 241, and 243 of the lower horizontal rib 227, respectively.

Referring also to FIGS. 44 and 47, each of the vertical ribs 229, 231, 233, and 235 projects from the inner surface of the peripheral wall 215a of the outer half 187 of the side sill 185 and extends vertically across the upper horizontal rib 225. The vertical ribs 229, 231, 233, and 235 have the common profile and they are formed integrally with both the upper horizontal rib 225 and the outer half 187 of the side sill 185.

Viewing in FIGS. 44 and 47, each of the vertical ribs 237, 239, 241, and 243 extends from the inner surface of the peripheral wall 215a of the outer half 187 of the side sill 185 upwardly to a level as high as the upper surface of the lower horizontal rib 227 and extends horizontally to the inner periphery of the outer half 187 of the side sill 186. The vertical ribs 237, 239, 241, and 243 have the common profile and they are formed integrally with both the lower horizontal rib 227 and the outer half 187 of the side sill 185.

The structurally deformable zone 223 is composed of the portion of the peripheral wall 215a that extends between a level as high as the upper surface of the lower horizontal rib 227 and a level immediately below the vertical ribs 229, 231, 233, and 235. The thickness of the peripheral wall 215a that extends over the structurally deformable zone is the same as other major portion of the peripheral wall 215a. The thickness of the peripheral wall 215a is the same as the thickness of the other walls of the outer half 187 of the side sill 185.

Figure 48:
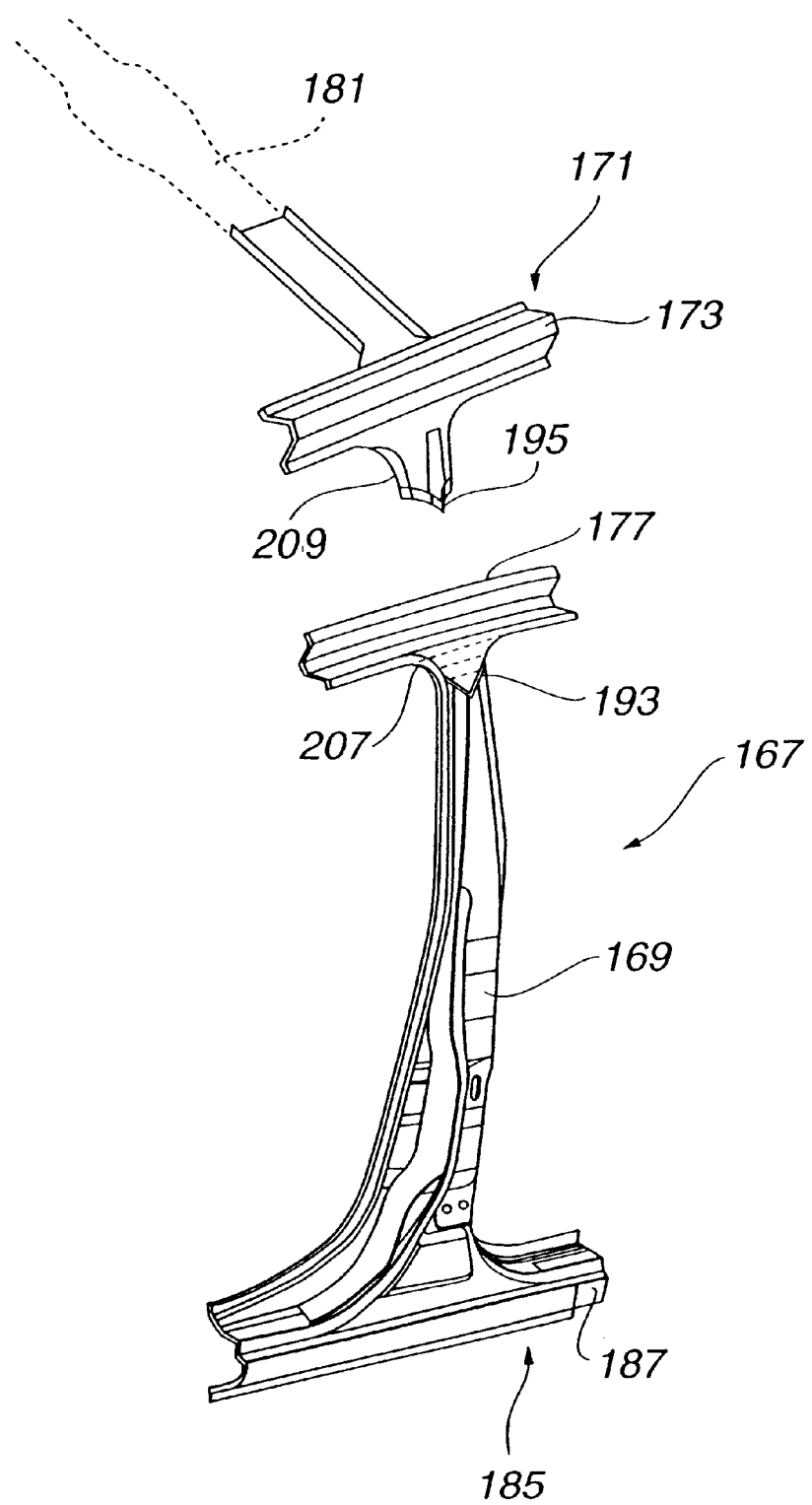
FIG. 48 is an exploded view showing the relationship between the front door latch pillar, side roof rail, and bored roof FIG. 49 a fragmentary exploded enlarged view showing the relationship between an upper structure portion of the front door latch pillar and side roof rail.
Figure 49:
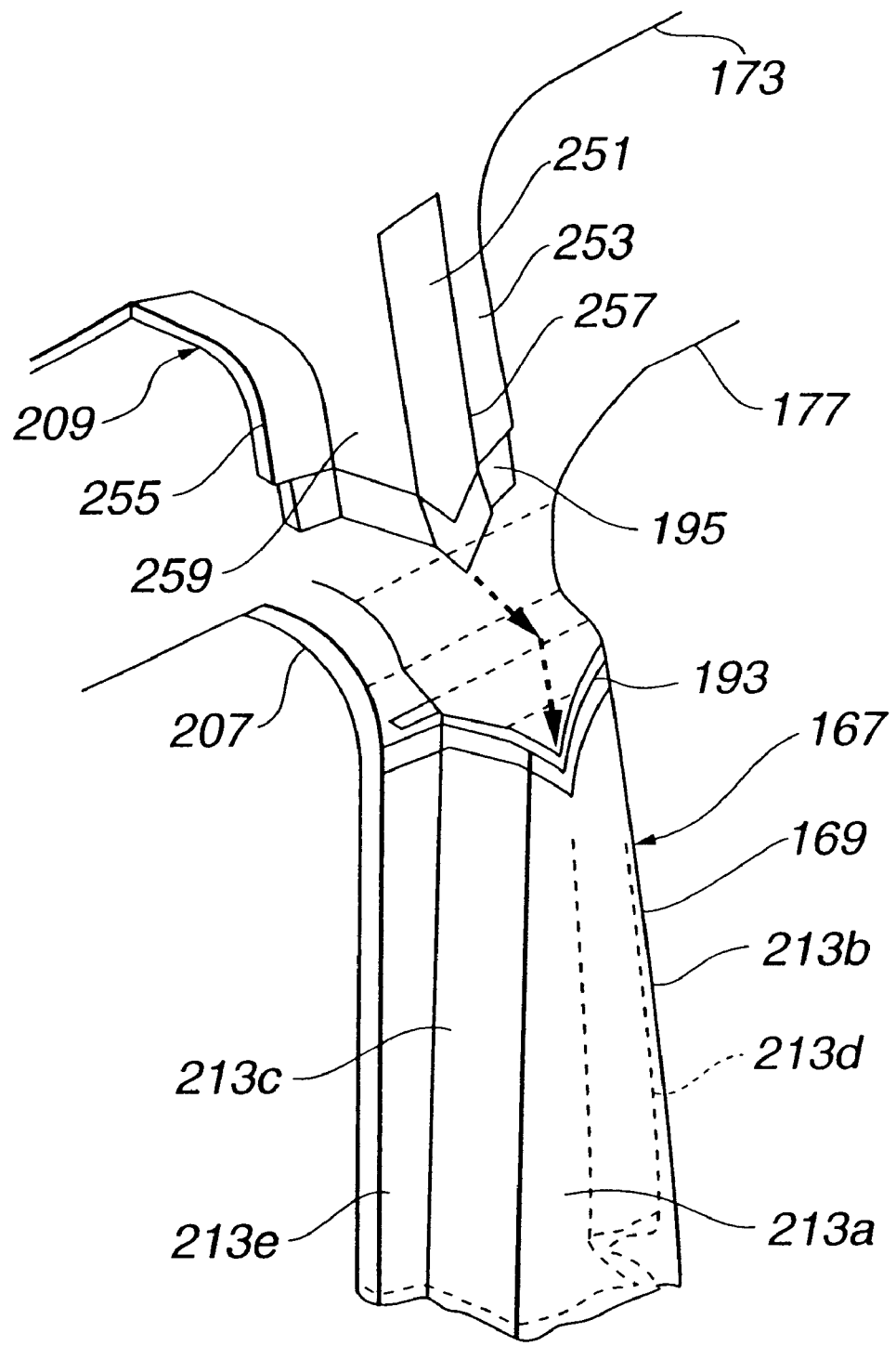
Figure 50:
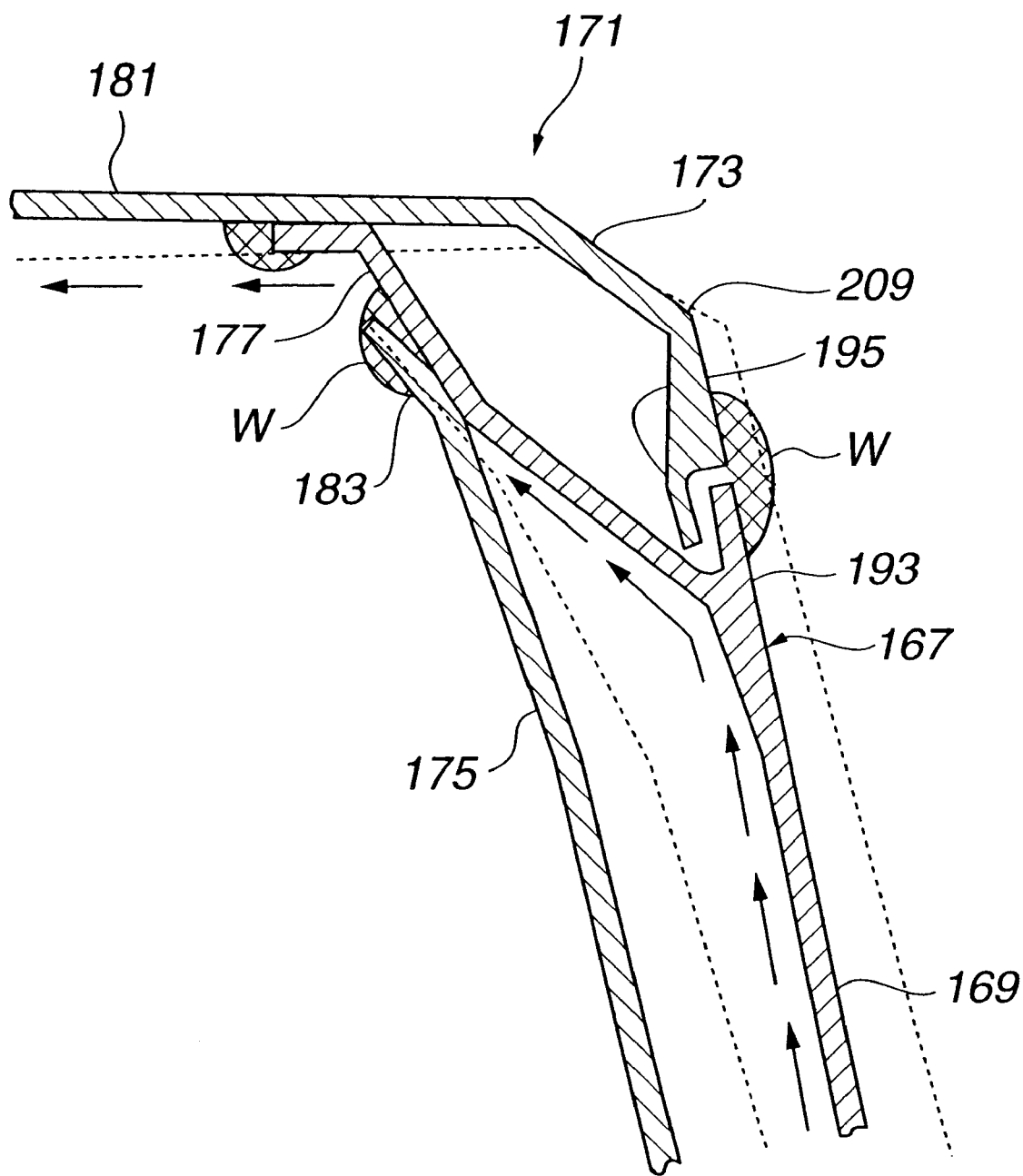
FIG. 50 is a fragmentary sectional view showing the front door latch pillar connected to the side roof rail and the bored roof.

Referring to FIGS. 48 to 50, the outer half 169 of the front door latch pillar 167 and the outer half 173 of the side roof rail 171 have a pillar-side joining site 193 and a rail-side joining site 195, respectively.

Each of the pillar-side and rail-side joining sites 193 and 195 has two sides spaced along the vehicle longitudinal line.

At an intermediate point between the two spaced sides, each of the joining sites 193 and 195 extends downwardly further than it does at each of the two spaced sides. For example, it may take V shaped configuration as viewed from the side of the vehicle. The pillar-side and rail-side joining sites 193 and 195 are joined and connected to overlap each other. In the illustrated example, the pillar-side joining site 193 is laid upon the rail-side joining site 195 from the side of the vehicle. If desired, the rail-side joining site 195 may be laid upon the pillar-side joining site 193 from the side of the vehicle.

As best seen in FIG. 49, at an upper end 207, the outer half 169 of the front door latch pillar 167 has integrally formed therewith the inner half 177 of the side roof rail 171. The cross sectional shape of the outer half 169 changes gradually toward the upper end 207. The pillar-side joining site 193 is located at a position below the upper end 207 and defines a pocket. This pillar-side joining site 193 has a slope extending slightly downwardly toward the peripheral wall 213a and defines a V-shaped periphery.

The outer half 173 of the side roof rail 171 has an integral prolongation 209 that is integrally formed with the rail-side joining site 195. The rail-side joining site 195 is attached to the lower end of the prolongation 209. The prolongation 209 has a cross sectional configuration mating with the cross sectional configuration of the outer half 169 of the front door latch pillar 167. The prolongation 209 has two spaced end walls 257 and 259 interconnected by a peripheral wall 251 and two joining flanges 253 and 255 extending from the end walls 257 and 259, respectively.

The rail-side joining site 195 projects from the lower end of the prolongation 209 and has a V-shaped configuration mating with the pillar-side joining site 193.

Referring to FIG. 43, in assembly, the body side outer and inner 163 and 165 are joined together to form the body side structure 161. The outer and inner halves 169 and 175 are joined together by welding to form the front door latch pillar 167, and the outer and inner halves 187 and 189 are joined together by welding to form the side sill 185. As shown in FIG. 50, at a joining site 183, the inner half 175 of the front door latch pillar 167 is joined, by welding W, to the inner half 177 of the side roof rail 171.

Next step is 161 to stand the front door latch pillar 167 on the side sill 185. Then the roof structure 191 is arranged such that the outer half 173 of the side roof rail 171 is located above the inner half 177 of the side roof rail 171. Subsequently, the roof structure 191, which includes the outer half 173 of the side roof rail and the bored roof 181, is lowered, bringing the raid-side joining site 195 into the pillar-side joining site 193. The rail-side and pillar-side joining sites are joined to each other by welding W as shown in FIG. 50. The joining sites 193 and 195 are joined to each other along a V-shaped bonding line.

The joining sites 193 and 195 are of the general V-shape. Thus, the pillar-side joining site 193 guides the rail-side joining site 195 to facilitate positioning and assembly of the roof structure 191 with the body side structure 161.

Figure 52:
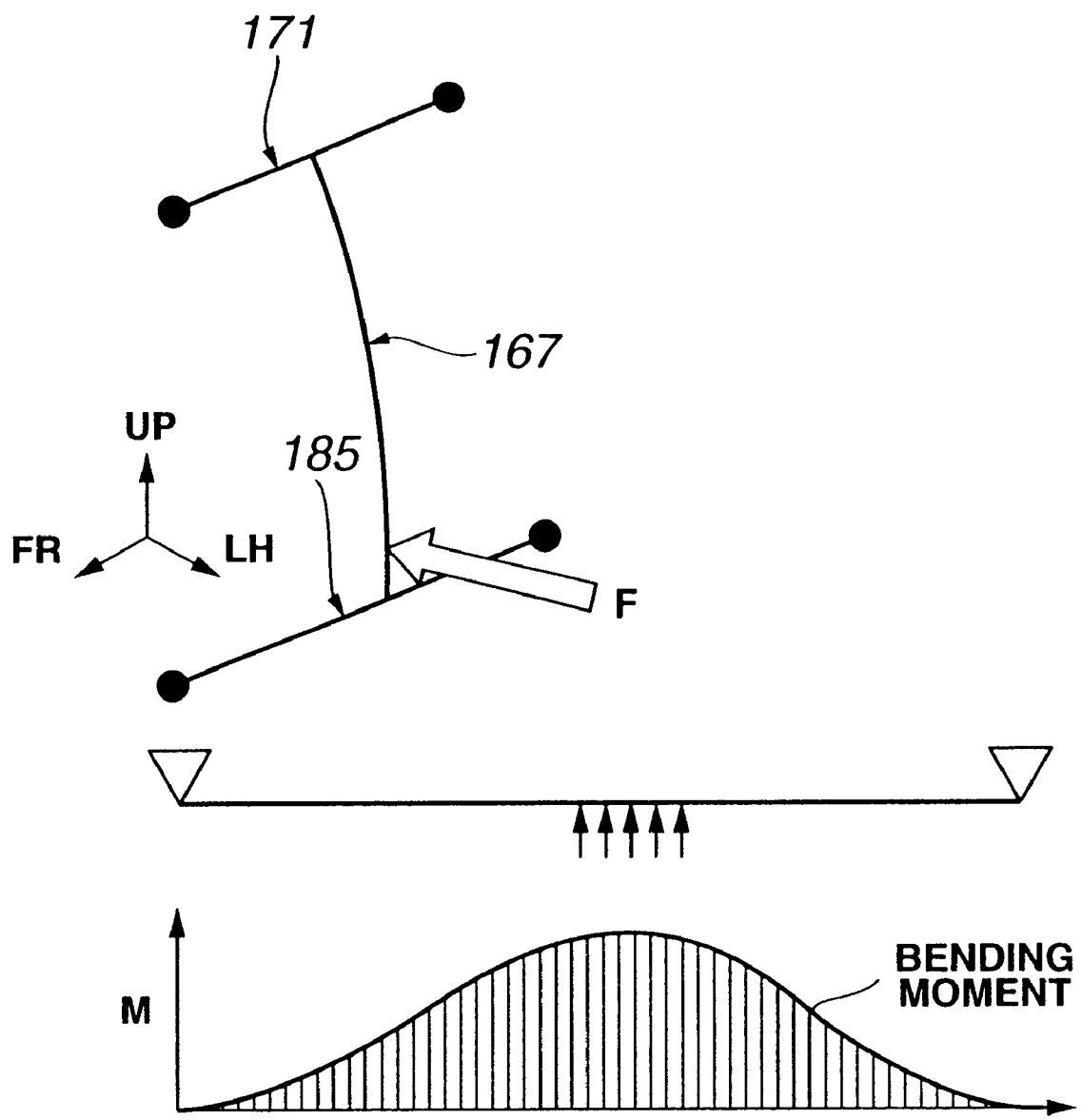
FIG. 52 is a view showing the variation of moment, which the front door latch pillar is subject to, during a side impact.

Referring to FIG. 52, if a force F is applied to the front door latch pillar 167 at an input point during a side impact, the magnitudes of bending moment M acting on the front door latch pillar 167 distribute, as illustrated, with the input point as a center. Application of the side impact force F induces a bending moment, about the lower end of the front door latch pillar 167, upon the side sill 185, and a bending moment, about the upper end of the front door latch pillar 167, upon the side roof rail 171.

A considerable reduction in the magnitude of such a moment acting on the joining sites 193 and 195 to separate them has been accomplished according to this preferred implementation because the joining sites 193 and 195 are located below the upper end of the front door latch pillar 167. Thus, the requisite bonding strength between the joining sites 193 and 195 is maintained, providing a reliable path for transmission of loads from the front door latch pillar 167 to the side roof rail 171 during a side impact.

Figure 51:
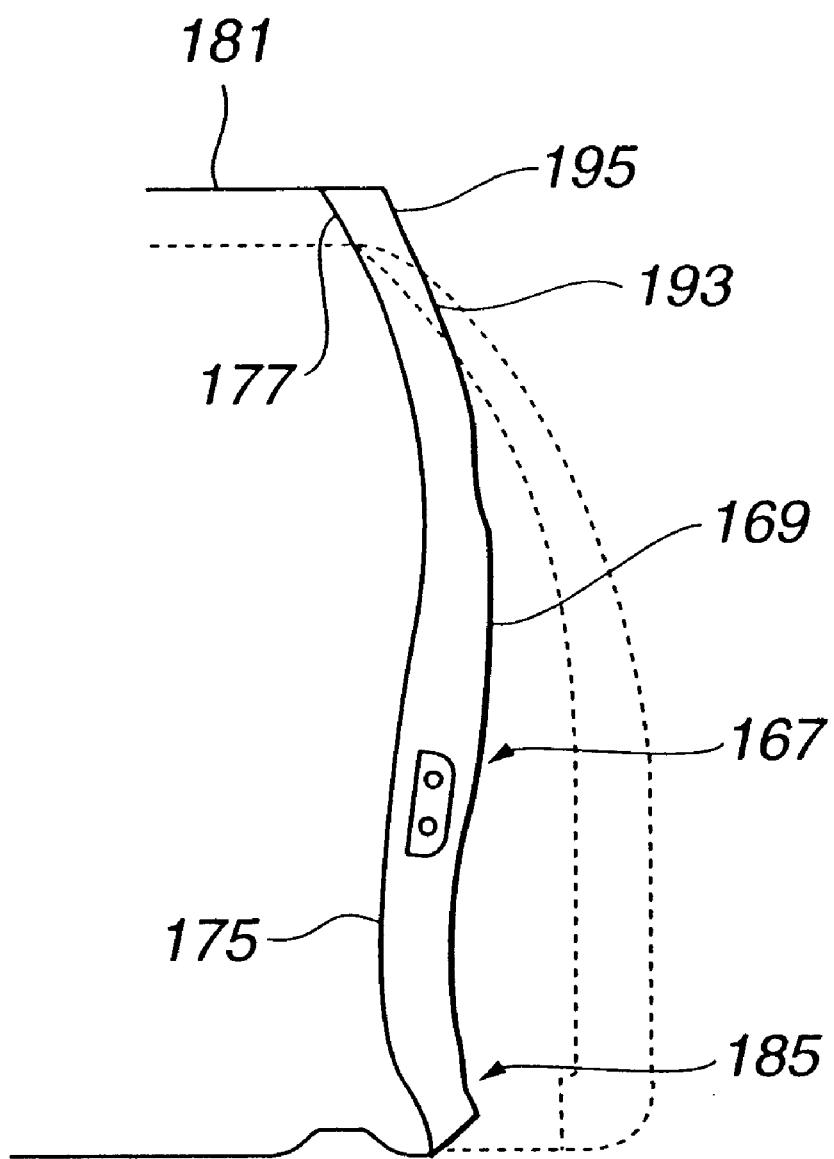
FIG. 51 is a view showing the front door latch pillar after deformation during a side impact.

FIG. 51 illustrates the manner of deformation of the front door latch pillar 167 upon application of force F during a side impact. Arrows in FIG. 50 illustrate the transmission of loads from the front door latch pillar 167 to the side roof rail 171 during the side impact. As seen from FIG. 50, the slope transmits loads efficiently from the outer half 169 of the front door latch pillar 167 to the inner half 177 of the side roof rail 171 and then to the bored roof 181b because the joining sites 195 and 193 are joined firmly.

This is the reason why the front door latch pillar 167 is deformed in a manner to push its upper end upwardly as shown in FIG. 51 during a side impact, with little displacement of its intermediate portion inwardly toward the passenger compartment. Thus, the inward deformation of the upper structure portion of the front door latch pillar 167 toward the passenger compartment is suppressed during a side impact due mainly to the distribution of loads.

Referring to FIG. 50, since the pillar-side joining site 193 is disposed laterally outside of the rail-side joining site 195, the loads induces a bonding strength at the welding point W and a force to bring the pillar-side joining site 193 into firm engagement with the rail-side joining site 195. Thus, sufficiently high bonding strength is maintained during a side impact. This provides ensured transmission of loads from the outer half 169 of the front door latch pillar 167 to the bored roof 181 via the outer half 173 of the side roof rail 171.

In this preferred implementation of the present invention, the pillar-side and rail-side joining sites 193 and 195 have V-shaped configurations, thus increasing a length of joint to be welded, resulting in an increased welding strength.

If the front door latch pillar 167 bears vertical load, a force component normal to the welded joint line between the pillar-side and roof-side joining sites 193 and 195 is induced. If the front door latch pillar 167 bears horizontal load, a force component normal to the welding joint line. Thus, a reduction is accomplished in variations of bonding strength at the welding portion W against variations in direction of load applied to the front door latch pillar 176.

The normal force component mentioned above imparts a tension stress to the welding joint. The bonding strength at the welding joint against a tension stress is greater than that against a shearing stress. Thus, the bonding strength is kept at a sufficiently high level. If the welding joint is subjected to a compression stress, the joining sites 193 and 195 are brought into firm engagement with each other to withstand this compression stress. Thus, it is possible to maintain high level of bonding strength. Accordingly, the transmission of loads is always ensured under stress due to vertical load and horizontal load as well.

The bonding strength at the welding joint is held at a high level if the front door latch pillar 167 bears a torsional stress. If a torsional stress is imparted to an element, a surface angled about 45 degrees bears the maximum tension stress. According to this preferred implementation, the joining sites 193 and 195 are of V-shaped configurations. Thus, the welding joint W bears mainly the maximum tension stress when the front door latch pillar 167 bears a torsional stress. Accordingly, the bonding strength is held at a high level.

The reliable distribution of loads to the side roof rail 171 and/or the bored roof rail 181 is always provided against different kinds of load imparted to the pillar 167, realizing impact energy absorption while suppressing deformation of the front door latch pillar 167.

Therefore, an increase in thickness of the wall of the front door latch pillar 167 and the side roof rail 171 is not longer needed, greatly suppressing an increase in vehicle weight.

As shown in FIG. 44, the upper structure portion of the front door pillar 167 has vertical inner integral ribs 211 to realize the bending strength characteristic shown in FIG. 6. Thus, the bending strength of the upper structure portion of the front door latch pillar 167 is greater than that of the lower structure portion.

Thus, during a side impact, in the same manner as the preceding preferred implementations, the lower structure portion of the front door latch pillar 167 is deformed inwardly toward the passenger compartment, but the upper structure portion is less deformed inwardly toward the passenger compartment (see FIG. 51). As previously described in connection with FIG. 50, the loads imparted on the upper structure portion of the pillar 167 to cause inward displacement toward the passenger compartment are distributed to the side roof rail 171 and also to the bored roof 181. The inward displacement of the upper structure portion of the pillar 167 is effectively suppressed.

During a side impact, the front door latch pillar 167 turns clockwise, viewing in FIG. 51, about the upper end thereof as a pivot because the side roof rail and its adjacent portions are structurally strong. This turning movement causes inward displacement of the lower end of the pillar 167 toward the passenger compartment.

With regard to the joining portion 185a (see FIG. 44), the structurally deformable zone 223 converts an input force F during a side impact into a moment (see a small arrow in FIG. 47) about a longitudinal line passing through the structurally deformable zone 223. This moment acts to bend the joining portion 185a about the longitudinal line. The upper and lower horizontal ribs 225 and 227 reinforce the joining portion 185a of the side sill 185, thus preventing or at least suppressing the occurrence of deformation of the peripheral wall 215a due to being stressed about a vertical axis.

Thus, the joining portion 185a of the side sill 185 is not compressed in the vehicle longitudinal direction during a side impact, The joining portion 185a, which has a considerable length of extension in the longitudinal direction, displaces inwardly toward the passenger compartment during a side impact. As a result, the side sill 185, side roof rail 171, and front door pillar structure 167 are deformed in a desired manner during a side impact, so that an increase in local deformation is suppressed.

Accordingly, the amount of absorption of impact energy is increased due to distribution of load to over the entirety in the longitudinal direction of the side sill 185 and the floor and also due to widened region used for deformation.

In this preferred implementation of the present invention, the pillar-side and rail-side joining sites 193 and 195 have V-shaped configurations, respectively. The configuration is not limited to this V-shaped configuration. If desired, a U-shaped configuration or an inverse V-shaped configuration may be used.

If desired, each of a pillar-side joining site 193 and a rail-side joining site 195 may combine a plurality of steps or shoulders to form a generally V-shaped configuration. In this case, the length of joint to be welded becomes long. Thus, increased bonding strength is realized, thus ensuring enhanced load transmission.

(Seventeenth Preferred Implementation)

Figure 53:
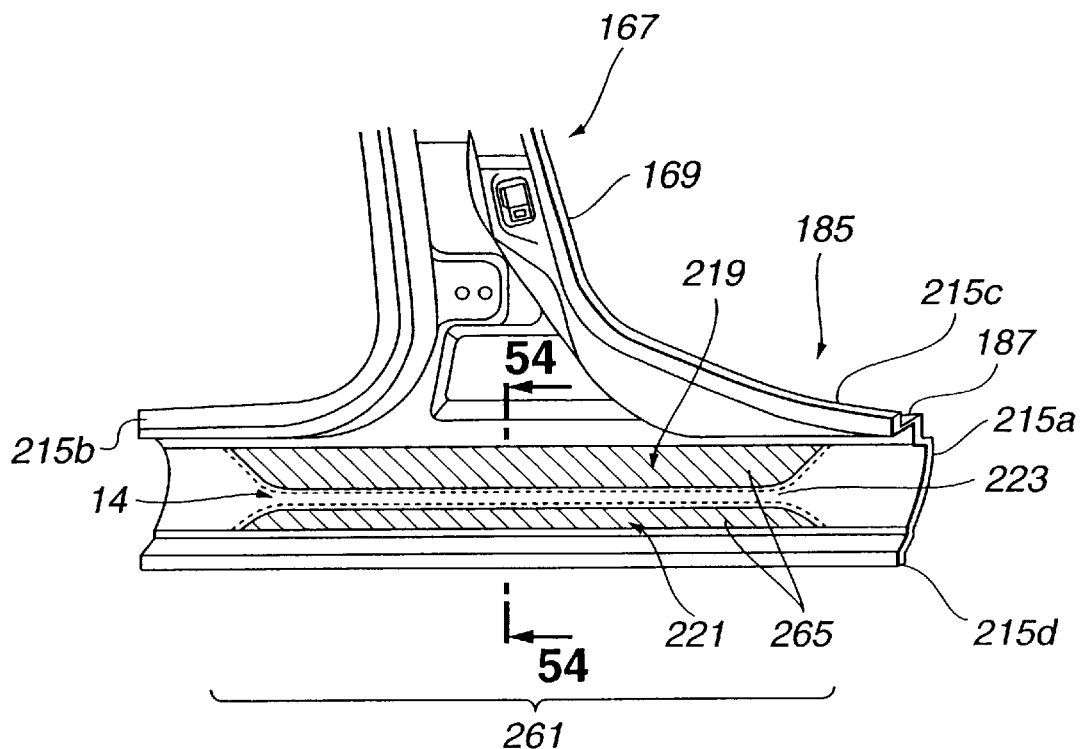
FIG. 53 is a fragmentary perspective view of a front door latch pillar with its pillar inner half removed, showing a seventeenth preferred implementation of the present invention.
Figure 54:
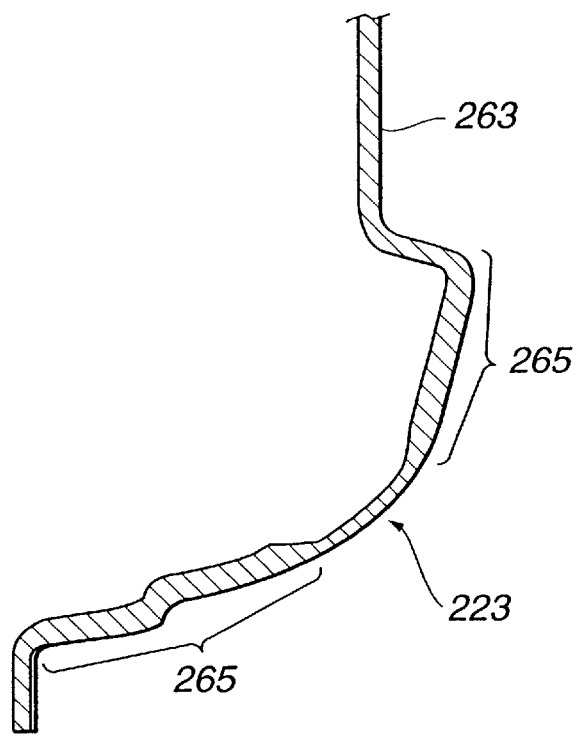
FIG. 54 is an enlarge cross section taken through the line 54—54 in FIG. 53.

Referring to FIGS. 53 and 54, a description is made on the seventeenth preferred implementation of the present invention.

This seventeenth preferred implementation is substantially the same as the sixteenth preferred implementation except the construction of upper and lower reinforcement elements 219 and 221 and that of a structurally deformable zone 223.

The upper and lower reinforcement elements 219 and 221 are in the form of thickened wall portions 265 within shadowed areas in FIG. 53 that extend along the vehicle longitudinal line over a range 261. Referring to FIG. 54, a thinned wall portion between the upper and lower thickened wall portions 265 constitutes the structurally deformable zone 223. The thickness of the thickened wall portions 265 is greater than the thickness of the other portion 263. The thickness of the thinned wall portion 223 is less than the thickness of the other portion 263.

(Eighteenth Preferred Implementation)

Figure 55:
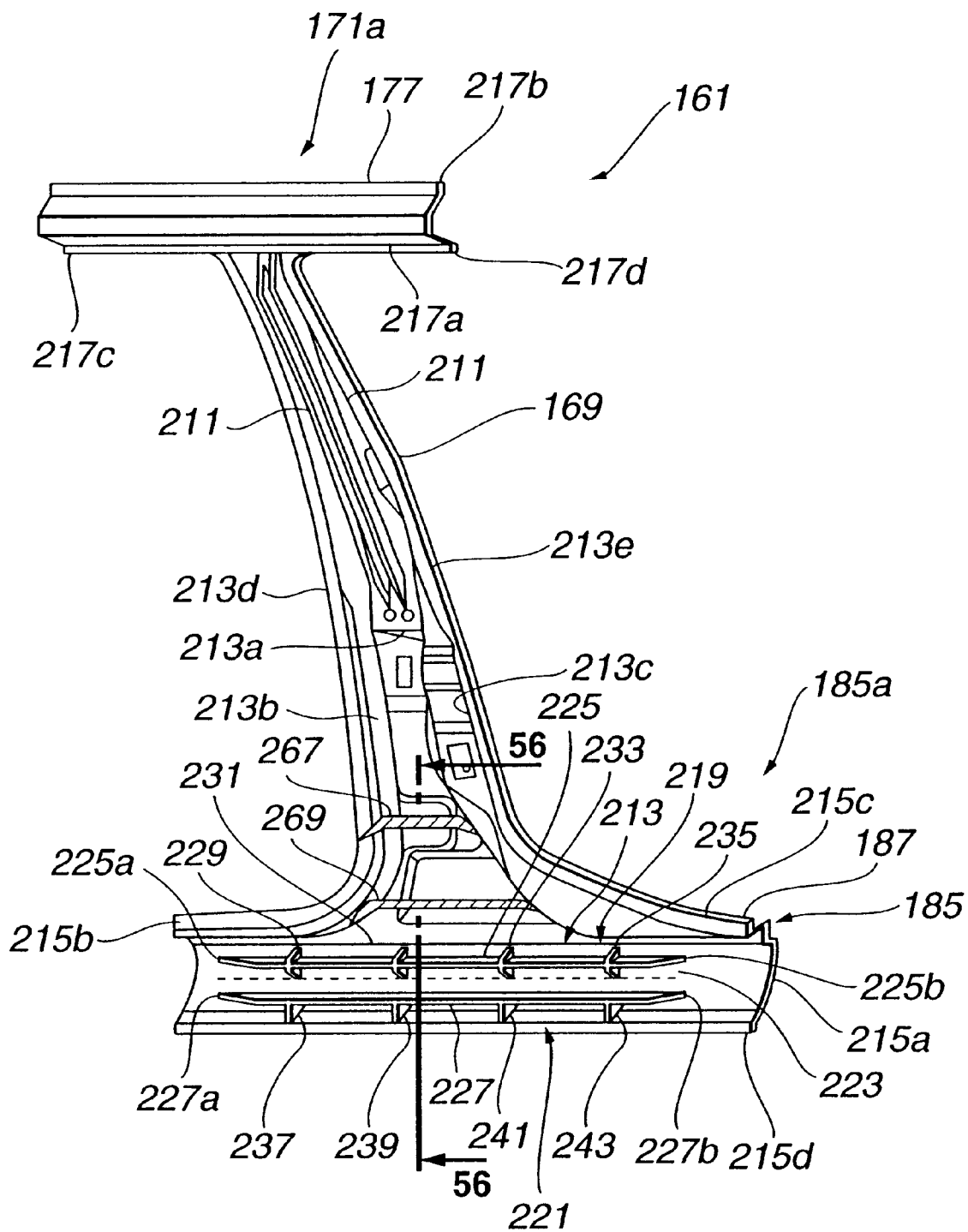
FIG. 55 is a similar view to FIG. 44, illustrating an eighteenth preferred implementation of the present invention.
Figure 56:
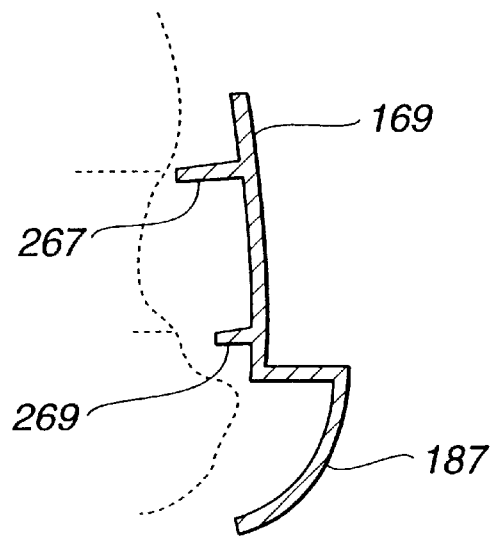
FIG. 56 is a cross section taken though the line 56—56 in FIG. 55.

Referring to FIGS. 55 to 57, a description is made on the eighteenth preferred implementation of the present invention.

This eighteenth preferred implementation is substantially the same as the sixteenth preferred implementation except the addition of two vertically spaced horizontal ribs 267 and 269 within a lower structure portion of a front door latch pillar 167.

The two horizontal ribs, namely an upper horizontal rib 267 and a lower horizontal rib 269, are provided to increase the strength of the wall of the front door latch pillar 167. As best seen in FIG. 57, the upper horizontal rib 267 is located immediately below a transition point 15 and the lower horizontal rib 269 is located below the upper horizontal rib 267.

As best seen in FIG. 56, the upper and lower horizontal rib 267 and 269 project from the inner surface of an outer half 169 of the front door latch pillar 167 inwardly toward the passenger compartment. The lower horizontal rib 269 projects less than the upper horizontal rib 267 does. The strength of wall due to the lower horizontal rib 269 is less than that imparted due to the upper horizontal rib 267. With this arrangement, it is possible to control the deformation of the lower structure portion of the front door latch pillar 167 during a side impact.

While the present invention has been particularly described in conjunction with the preferred embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

What is claimed is:

1. A motor vehicle comprising:
   a vertically oriented member having an upper end portion joined to a roof side rail and a lower end portion joined to a side sill,
   said vertically oriented member having a transition point between the upper and lower end portions,
   said vertically oriented member including a reinforcement measure and a deformation permission measure, said transition point being located between said reinforcement measure and said deformation permission measure,
   wherein said vertically oriented member includes an upper structure portion extending between the upper end portion and said transition point and a lower structure portion extending between said transition point and the lower end, and wherein said upper structure portion has walls thickened to implement said reinforcement measure, and said lower structure portion has walls thinned, as compared to said thickened walls, to implement said deformation permission measure.

2. The motor vehicle body as claimed in claim 1, wherein said upper structure portion has thickened walls and said lower structure portion has thinned walls that are thinner than said thickened walls.

3. A motor vehicle comprising:
   a vertically oriented member having an upper end portion joined to a roof side rail and a lower end portion joined to a side sill,
   said vertically oriented member having a transition point between the upper and lower end portions,
   said vertically oriented member including a reinforcement measure and a deformation permission measure, said transition point being located between said reinforcement measure and said deformation permission measure,
   wherein said vertically oriented member includes an upper structure portion extending between the upper end portion and said transition point and a lower structure portion extending between said transition point and the lower end, and wherein said upper structure portion has varying cross sectional area to implement said reinforcement measure, and said lower structure portion has varying cross sectional areas to implement said deformation permission measure.

4. The motor vehicle body as claimed in claim 3, wherein said upper structure portion has a first set of varying cross sectional areas to implement said reinforcement measure and said lower structure portion has a second set of varying cross sectional areas to implement said deformation permission measure, the cross sectional areas of said first set are greater than the cross sectional areas of the second set.

5. A motor vehicle comprising:
   a vertically oriented member having an upper end portion joined to a roof side rail and a lower end portion joined to a side sill,
   said vertically oriented member having a transition point between the upper and lower end portions,
   said vertically oriented member including a reinforcement measure and a deformation permission measure, said transition point being located between said reinforcement measure and said deformation permission measure,
   wherein said vertically oriented member includes an upper structure portion extending between the upper end portion and said transition point and a lower structure portion extending between said transition point and the lower end, and wherein said upper structure portion has varying, section modulus to implement said reinforcement measure, and said lower structure portion has varying section modulus to implement said deformation permission measure.

6. The motor vehicle body as claimed in claim 5, wherein said upper structure portion has a first set of varying section modulus to implement said reinforcement measure and said lower structure portion has a second set of varying section modulus to implement said deformation permission measure, the varying section modulus of said first set are greater than the varying section modulus of the second set.

7. A motor vehicle comprising:
a vertically oriented member having an upper end portion joined to a roof side rail and a lower end portion joined to a side sill,
said vertically oriented member having a transition point between the upper and lower end portions,
said vertically oriented member including a reinforcement measure and a deformation permission measure, said transition point being located between said reinforcement measure and said deformation permission measure,
wherein said vertically oriented member includes an upper structure portion extending between the tipper end portion and said transition point and a lower structure portion extending between said transition point and the lower end, and wherein said upper structure portion has reinforcement elements to implement said reinforcement measure, and said lower structure portion has varying section modululus to implement said deformation permission measure.

8. A motor vehicle body, comprising:
a vertically oriented member having an upper end portion joined to a roof side rail and a lower end portion joined to a side sill,
a transition point between said upper end portion and said lower end portion, said transition point dividing said vertically oriented member into an upper structure portion extending between the upper end portion and said transition point and a lower structure portion extending between said transition point and the lower end,
a reinforcement measure included in said upper structure portion above said transition point, and
a deformation permission measure included in said lower structure portion below said transition point,
wherein said reinforcement measure increases a strength of said upper structure portion and wherein said deformation permission measure decreases a strength of said lower structure portion, and
wherein said deformation permission measure extends along substantially an entire length of the lower structure portion between said transition point and said side sill.

9. A motor vehicle body as claimed in claim 8, wherein a strength of said deformation permission measure decreases substantially continuously between said transition point and said lower end.

10. A motor vehicle body as claimed in claim 9, wherein a strength of said reinforcement measure increases between said transition point and said upper end.

11. A motor vehicle body as claimed in claim 10, wherein said reinforcement measure comprises at least one vertical rib.

12. A motor vehicle body as claimed in claim 11, further comprising:
an upper side sill longitudinal reinforcement element;
a lower side sill longitudinal reinforcement element; and
a substantially longitudinal structurally deformable zone disposed between said upper side sill longitudinal reinforcement element and said lower side sill longitudinal reinforcement element.

13. A motor vehicle body as claimed in claim 12, wherein said side sill longitudinal reinforcement elements comprises vertical reinforcing ribs, and wherein said structurally deformable zone comprises a thinned wall section.

14. A motor vehicle body, comprising:
a vertically oriented member having an upper end portion joined to a roof side rail and a lower end portion joined to a side sill,
said vertically oriented member having a transition point between the upper and lower end portions,
said vertically oriented member including a reinforcement measure and a deformation permission measure, said transition point being located between said reinforcement measure and said deformation permission measure,
wherein said vertically oriented member is integrally formed by casting and includes an upper structure portion extending between the upper end portion and said transition point and a lower structure portion extending between said transition point and the lower end,
wherein said upper structure portion implementing said reinforcement measure, and said lower structure portion implementing said deformation permission measure, and
wherein a strength of said deformation permission measure decreases substantially continuously between said transition point and said lower end.

15. The motor vehicle body as claimed in claim 14, wherein said upper structure portion has reinforcement elements to implement said reinforcement measure and said lower structure portion has a varying section modulus to implement said deformation permission measure.

16. The motor vehicle body as claimed in claim 14, wherein said vertically oriented member is formed of a light metal alloy casting.

17. A motor vehicle as claimed in claim 14, wherein a strength of said reinforcement measure decreases substantially continuously between an upper end thereof and said transition point.

18. The motor vehicle body as claimed in claim 14, wherein said transition point is located below an intermediate point between the upper and lower portions.

19. The motor vehicle body as claimed in claim 18, wherein said transition point defines a boundary of said reinforcement measure with said deformation permission measure.

20. The motor vehicle body as claimed in claim 19, wherein said reinforcement measure changes abruptly into said deformation permission measure at said transition point.

21. The motor vehicle body as claimed in claim 19, wherein said reinforcement measure changes gradually into said deformation permission measure at said transition point.

22. The motor vehicle body as claimed in claim 14, wherein said vertically oriented member is in the form of a pillar.

23. The motor vehicle body as claimed in claim 22, wherein said side sill includes spaced reinforcement elements and a structurally deformable zone extending between said spaced reinforcement elements.

24. The motor vehicle body as claimed in claim 22, wherein said pillar is a front door latch pillar.

25. The motor vehicle body as claimed in claim 24, wherein said front door latch pillar includes a door hinge.

26. The motor vehicle as claimed in claim 14, wherein said reinforcement measure of said vertically oriented member includes a plurality of ribs. measure, and said lower structure portion has varying, section modulus to implement said deformation permission measure.

27. The motor vehicle body as claimed in claim 26, wherein said upper structure portion has vertical ribs and transverse ribs to implement said reinforcement measure.

28. The motor vehicle body as claimed in claim 26, wherein said upper structure portion has vertical ribs to implement said reinforcement measure and said side sill has reinforcement elements and a structurally deformable zone between said reinforcement elements.

29. A motor vehicle as claimed in claim 28, wherein said reinforcement elements comprise at least one horizontal rib longitudinally disposed along said side sill to extend from at least a point behind said vertically oriented member to a point in front of said vertically oriented member.

30. A motor vehicle as claimed in claim 28, wherein said reinforcement elements comprise horizontal ribs and vertical ribs.

31. A motor vehicle as claimed in claim 28, wherein said reinforcement elements comprise thickened walls, and wherein said structurally deformable zone comprises a thinned wall having a thickness less than that of said reinforcement elements.

32. A motor vehicle as claimed in claim 31, wherein said thickened walls extend in said longitudinal direction to extend from at least a point behind said vertically oriented member to a point in front of said vertically oriented member.

* * * * *